(12) United States Patent
Herman et al.

(10) Patent No.: US 12,038,756 B2
(45) Date of Patent: Jul. 16, 2024

(54) INTELLIGENT CLEANING ROBOT

(71) Applicant: CARNEGIE MELLON UNIVERSITY, Pittsburgh, PA (US)

(72) Inventors: Herman Herman, Pittsburgh, PA (US); Karl Muecke, Pittsburgh, PA (US); Jose Gonzalez-Mora, Pittsburgh, PA (US); Raphael Bouterige, Pittsburgh, PA (US); Jason Kulk, Pittsburgh, PA (US); Jaime Bourne, Pittsburgh, PA (US); Jean-Phillipe Tardif, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 623 days.

(21) Appl. No.: 16/954,893

(22) PCT Filed: Dec. 19, 2018

(86) PCT No.: PCT/US2018/066517
§ 371 (c)(1),
(2) Date: Jun. 17, 2020

(87) PCT Pub. No.: WO2019/126332
PCT Pub. Date: Jun. 27, 2019

(65) Prior Publication Data
US 2020/0409382 A1    Dec. 31, 2020

Related U.S. Application Data

(60) Provisional application No. 62/752,052, filed on Oct. 29, 2018, provisional application No. 62/702,656, (Continued)

(51) Int. Cl.
G05D 1/00    (2024.01)
A47L 9/28    (2006.01)
(Continued)

(52) U.S. Cl.
CPC .......... *G05D 1/0238* (2013.01); *A47L 9/2826* (2013.01); *A47L 9/2852* (2013.01); (Continued)

(58) Field of Classification Search
CPC .. G05D 1/0238; G05D 1/0088; G05D 1/0094; G05D 1/0214; G05D 1/0274; (Continued)

(56) References Cited

U.S. PATENT DOCUMENTS

| 5,040,116 A | * | 8/1991 | Evans, Jr. | ............ | G05D 1/0246 701/28 |
| 5,187,663 A | * | 2/1993 | Kamimura | ........... | G05D 1/0244 356/3.01 |

(Continued)

FOREIGN PATENT DOCUMENTS

| CN | 103033189 A | 4/2013 |
| JP | 2013235870 A | 11/2013 |

(Continued)

OTHER PUBLICATIONS

International Search Report and Written Opinion for International application No. PCT/US2018/066517, mailed on May 29, 2019, 12 pages.

(Continued)

*Primary Examiner* — Bhavesh V Amin
(74) *Attorney, Agent, or Firm* — KDW Firm PLLC

(57) ABSTRACT

An intelligent, autonomous interior cleaning robot capable of autonomously mapping and cleaning multiple rooms in a house in an intelligent manner is described. Various combinations of passive and active sensors may be used to perform mapping, localization, and obstacle avoidance. In particular, the robot uses stereo cameras with a static projected light pattern to generate 3D data. In addition, the robot may use optical sensors in various locations, laser ToF (Continued)

sensors, inertial measurement units and visual odometry to enhance the localization and mapping capabilities.

22 Claims, 16 Drawing Sheets

Related U.S. Application Data filed on Jul. 24, 2018, provisional application No. 62/620,898, filed on Jan. 23, 2018, provisional application No. 62/607,775, filed on Dec. 19, 2017.

(51) Int. Cl.
| | | |
|---|---|---|
| *A47L 9/30* | (2006.01) | |
| *A47L 11/40* | (2006.01) | |
| *G01C 21/00* | (2006.01) | |
| *G01C 21/20* | (2006.01) | |

(52) U.S. Cl.
CPC ............ *A47L 9/30* (2013.01); *A47L 11/4011* (2013.01); *A47L 11/4061* (2013.01); *A47L 11/4066* (2013.01); *G01C 21/206* (2013.01); *G01C 21/383* (2020.08); *G05D 1/0088* (2013.01); *G05D 1/0094* (2013.01); *G05D 1/0214* (2013.01); *G05D 1/0274* (2013.01); *A47L 2201/04* (2013.01)

(58) Field of Classification Search
CPC .......... G05D 2201/0203; G05D 1/0251; A47L 9/2826; A47L 9/2852; A47L 9/30; A47L 11/4011; A47L 11/4061; A47L 11/4066; A47L 2201/04; A47L 9/2894; A47L 9/2831; A47L 2201/02; G01C 21/206; G01C 21/383
See application file for complete search history.

(56) References Cited

U.S. PATENT DOCUMENTS

| | | | | |
|---|---|---|---|---|
| 5,461,478 A * | 10/1995 | Sakakibara | .......... | G01B 11/245 356/623 |
| 5,794,166 A * | 8/1998 | Bauer | .................. | G05D 1/0272 318/587 |
| 6,629,028 B2 * | 9/2003 | Paromtchik | .......... | G05D 1/0236 701/28 |
| 6,732,826 B2 | 5/2004 | Song et al. | | |
| 7,162,056 B2 | 1/2007 | Burl et al. | | |
| 7,164,118 B2 * | 1/2007 | Anderson | ............... | G01S 17/87 250/221 |
| 7,177,737 B2 | 2/2007 | Karlsson et al. | | |
| 7,206,677 B2 * | 4/2007 | Hulden | ................ | G05D 1/0217 701/25 |
| 7,239,105 B2 | 7/2007 | Lim et al. | | |
| 7,386,163 B2 * | 6/2008 | Sabe | ....................... | G06V 20/10 348/42 |
| 7,539,557 B2 * | 5/2009 | Yamauchi | ............... | G05D 1/0088 700/262 |
| 7,801,645 B2 * | 9/2010 | Taylor | ..................... | G01S 17/10 318/567 |
| 7,860,301 B2 | 12/2010 | Se et al. | | |
| 7,963,736 B2 * | 6/2011 | Takizawa | .............. | H01L 21/681 414/217 |
| 8,386,081 B2 * | 2/2013 | Landry | ................. | G05D 1/0272 700/250 |
| 8,428,778 B2 * | 4/2013 | Landry | ..................... | G05D 3/12 700/250 |
| 8,463,018 B2 | 6/2013 | Chung et al. | | |
| 8,508,388 B2 | 8/2013 | Karlsson et al. | | |
| 8,532,368 B2 | 9/2013 | Se et al. | | |
| 8,577,538 B2 | 11/2013 | Lenser et al. | | |
| 8,788,092 B2 * | 7/2014 | Casey | .................. | G05D 1/0238 700/245 |
| 8,798,840 B2 * | 8/2014 | Fong | ..................... | G05D 1/0246 701/25 |
| 8,830,091 B2 | 9/2014 | Karlsson et al. | | |
| 8,874,263 B2 | 10/2014 | Kwak et al. | | |
| 8,874,264 B1 | 10/2014 | Chiappetta et al. | | |
| 8,880,271 B2 | 11/2014 | Jeon | | |
| 8,897,947 B2 * | 11/2014 | Nakano | ................... | G09B 29/10 701/25 |
| 8,970,693 B1 * | 3/2015 | Chang | ................... | G06T 19/006 348/136 |
| 8,996,292 B2 * | 3/2015 | Park | ........................ | G09B 29/00 701/25 |
| 9,002,511 B1 * | 4/2015 | Hickerson | ............ | G05D 1/0248 700/245 |
| 9,020,641 B2 | 4/2015 | Jeong et al. | | |
| 9,104,204 B2 * | 8/2015 | Jones | ......................  | A47L 11/00 |
| 9,218,003 B2 | 12/2015 | Fong et al. | | |
| 9,250,081 B2 | 2/2016 | Gutmann et al. | | |
| 9,286,810 B2 * | 3/2016 | Eade | ....................... | G06F 16/24 |
| 9,339,163 B2 | 5/2016 | Noh et al. | | |
| 9,404,756 B2 | 8/2016 | Fong et al. | | |
| 9,453,743 B2 | 9/2016 | Lee et al. | | |
| 9,456,725 B2 | 10/2016 | Kim et al. | | |
| 9,508,235 B2 * | 11/2016 | Suessemilch | .......... | G03B 21/20 |
| 9,517,767 B1 * | 12/2016 | Kentley | ................ | B60W 10/30 |
| 9,519,289 B2 | 12/2016 | Munich et al. | | |
| 9,582,889 B2 | 2/2017 | Shpunt et al. | | |
| 9,632,505 B2 * | 4/2017 | Hickerson | ............ | G05D 1/0248 |
| 9,701,239 B2 * | 7/2017 | Kentley | ................ | G05D 1/0248 |
| 9,785,148 B2 | 10/2017 | Yun | | |
| 9,840,003 B2 * | 12/2017 | Szatmary | ............. | B25J 11/0085 |
| 10,025,886 B1 * | 7/2018 | Rublee | ................. | G01B 11/254 |
| 10,089,778 B2 * | 10/2018 | Moule | ...................... | G06T 7/593 |
| 10,325,336 B2 * | 6/2019 | Kotake | .................. | G06T 1/0007 |
| 10,422,648 B2 * | 9/2019 | Afrouzi | ..................... | G06T 7/62 |
| 10,609,862 B2 * | 4/2020 | Wu | .......................... | G01S 17/89 |
| 10,612,929 B2 * | 4/2020 | Afrouzi | ................... | G05D 1/027 |
| 10,732,639 B2 * | 8/2020 | Palanisamy | ............. | G06N 3/08 |
| 10,935,383 B1 * | 3/2021 | Ebrahimi Afrouzi | .. | G01C 21/30 |
| 2004/0148057 A1 * | 7/2004 | Breed | .................. | G02B 13/008 700/242 |
| 2005/0000543 A1 * | 1/2005 | Taylor | .................. | G05D 1/0274 134/18 |
| 2005/0010330 A1 * | 1/2005 | Abramson | ........... | G05D 1/0225 318/568.12 |
| 2005/0055792 A1 * | 3/2005 | Kisela | .................. | G05D 1/0227 15/319 |
| 2005/0065662 A1 * | 3/2005 | Reindle | ................. | A47L 9/2821 701/1 |
| 2005/0166355 A1 * | 8/2005 | Tani | ....................... | G05D 1/027 15/319 |
| 2005/0182518 A1 * | 8/2005 | Karlsson | ................ | G06V 10/84 700/253 |
| 2005/0251292 A1 * | 11/2005 | Casey | .................. | G05D 1/0238 700/245 |
| 2005/0253555 A1 * | 11/2005 | Lee | ....................... | A47L 9/2873 320/115 |
| 2005/0278888 A1 * | 12/2005 | Reindle | .................. | A47L 9/2857 15/319 |
| 2006/0012493 A1 * | 1/2006 | Karlsson | ................ | G05D 1/024 701/532 |
| 2006/0025888 A1 * | 2/2006 | Gutmann | ................ | G06T 7/593 700/253 |
| 2006/0191096 A1 * | 8/2006 | Sudo | ........................ | A47L 9/009 15/319 |
| 2006/0237037 A1 * | 10/2006 | Kim | ..................... | G05D 1/0219 134/21 |
| 2006/0293794 A1 * | 12/2006 | Harwig | ................. | G05D 1/0261 180/23 |
| 2007/0042716 A1 * | 2/2007 | Goodall | ............... | G05D 1/0274 318/568.11 |
| 2007/0156286 A1 * | 7/2007 | Yamauchi | ............... | G05D 1/027 700/245 |
| 2007/0192910 A1 * | 8/2007 | Vu | ........................ | G05D 1/0246 901/1 |

(56) References Cited

U.S. PATENT DOCUMENTS

| | | | |
|---|---|---|---|
| 2007/0201863 A1* | 8/2007 | Wilson | G06F 3/0425 396/429 |
| 2007/0234492 A1* | 10/2007 | Svendsen | B60L 50/52 15/49.1 |
| 2007/0257910 A1* | 11/2007 | Gutmann | G06V 20/10 700/262 |
| 2008/0015738 A1* | 1/2008 | Casey | G05D 1/0238 700/258 |
| 2008/0027591 A1* | 1/2008 | Lenser | G05D 1/0274 701/28 |
| 2008/0065266 A1* | 3/2008 | Kim | G05D 1/0225 901/1 |
| 2008/0088702 A1* | 4/2008 | Linsenmaier | H04N 23/811 348/119 |
| 2008/0091305 A1 | 4/2008 | Svendsen et al. | |
| 2008/0151233 A1* | 6/2008 | Blanke | G01N 21/47 901/47 |
| 2008/0273791 A1* | 11/2008 | Lee | G06V 20/52 382/173 |
| 2009/0082879 A1* | 3/2009 | Dooley | G06N 3/004 700/3 |
| 2009/0194137 A1* | 8/2009 | Friedman | A47L 9/281 701/532 |
| 2009/0252580 A1* | 10/2009 | Takizawa | H01L 21/68707 414/806 |
| 2009/0276092 A1* | 11/2009 | Yoon | G05D 1/0274 901/1 |
| 2009/0281661 A1* | 11/2009 | Dooley | B60L 15/20 901/1 |
| 2010/0049365 A1* | 2/2010 | Jones | G05D 1/0255 901/1 |
| 2010/0082193 A1* | 4/2010 | Chiappetta | H02J 50/10 455/127.1 |
| 2010/0152945 A1* | 6/2010 | Park | G06T 7/75 701/28 |
| 2010/0217528 A1* | 8/2010 | Sato | G05D 1/0214 701/300 |
| 2010/0257691 A1* | 10/2010 | Jones | A47L 9/0494 15/319 |
| 2011/0054689 A1* | 3/2011 | Nielsen | G05D 1/0214 700/258 |
| 2011/0166737 A1* | 7/2011 | Tanaka | G05D 1/0217 701/25 |
| 2011/0202175 A1* | 8/2011 | Romanov | A47L 11/4091 700/250 |
| 2011/0204209 A1* | 8/2011 | Barrows | H01L 27/14625 250/214.1 |
| 2011/0316695 A1* | 12/2011 | Li | G05D 1/0016 340/539.13 |
| 2012/0095619 A1* | 4/2012 | Pack | B25J 9/161 701/2 |
| 2012/0121161 A1* | 5/2012 | Eade | G06F 16/29 901/1 |
| 2012/0125363 A1* | 5/2012 | Kim | A47L 9/2847 134/6 |
| 2012/0185094 A1 | 7/2012 | Rosenstein et al. | |
| 2012/0197464 A1* | 8/2012 | Wang | B25J 9/1664 701/28 |
| 2012/0247510 A1* | 10/2012 | Chen | G05D 1/0219 134/18 |
| 2013/0204483 A1* | 8/2013 | Sung | G05D 1/0248 701/28 |
| 2013/0325244 A1* | 12/2013 | Wang | B25J 11/009 701/26 |
| 2014/0043309 A1* | 2/2014 | Go | G01S 7/4817 345/207 |
| 2014/0207282 A1* | 7/2014 | Angle | G05B 15/02 901/1 |
| 2014/0247354 A1* | 9/2014 | Knudsen | G06T 7/85 348/148 |
| 2014/0350839 A1* | 11/2014 | Pack | G05D 1/0231 901/1 |
| 2015/0000068 A1* | 1/2015 | Tsuboi | A47L 9/2852 901/1 |
| 2015/0052703 A1* | 2/2015 | Lee | A47L 9/2815 701/28 |
| 2015/0157182 A1* | 6/2015 | Noh | A47L 11/4061 701/28 |
| 2015/0290795 A1* | 10/2015 | Oleynik | A47J 36/321 700/257 |
| 2015/0375395 A1* | 12/2015 | Kwon | A47L 9/2873 901/30 |
| 2016/0059412 A1* | 3/2016 | Oleynik | B25J 19/02 700/250 |
| 2016/0070268 A1* | 3/2016 | Ko | G05D 1/0225 701/22 |
| 2016/0147230 A1 | 5/2016 | Munich et al. | |
| 2016/0148433 A1* | 5/2016 | Petrovskaya | G02B 27/01 345/633 |
| 2016/0158942 A1* | 6/2016 | Augenbraun | G05D 1/0227 901/10 |
| 2016/0188977 A1* | 6/2016 | Kearns | H04N 7/185 348/113 |
| 2016/0375592 A1* | 12/2016 | Szatmary | B25J 9/1674 700/250 |
| 2016/0378117 A1* | 12/2016 | Szatmary | G06V 10/145 382/153 |
| 2017/0010623 A1* | 1/2017 | Tang | G06V 20/17 |
| 2017/0036349 A1 | 2/2017 | Dubrovsky et al. | |
| 2017/0039756 A1* | 2/2017 | Moule | G01B 11/2504 |
| 2017/0105592 A1 | 4/2017 | Fong et al. | |
| 2018/0125003 A1* | 5/2018 | Wu | G06V 10/56 |
| 2018/0246520 A1* | 8/2018 | Martinson | G05D 1/0094 |
| 2019/0114798 A1* | 4/2019 | Afrouzi | G06T 7/11 |
| 2019/0120633 A1* | 4/2019 | Afrouzi | G01S 7/4808 |

FOREIGN PATENT DOCUMENTS

| | | | | |
|---|---|---|---|---|
| WO | WO-2005055796 A2 * | 6/2005 | | A47L 11/24 |
| WO | WO-2019126332 A1 * | 6/2019 | | A47L 11/4011 |

OTHER PUBLICATIONS

International Preliminary Report on Patentability for International application No. PCT/US2018/066517, mailed on May 29, 2019, 9 pages.

* cited by examiner

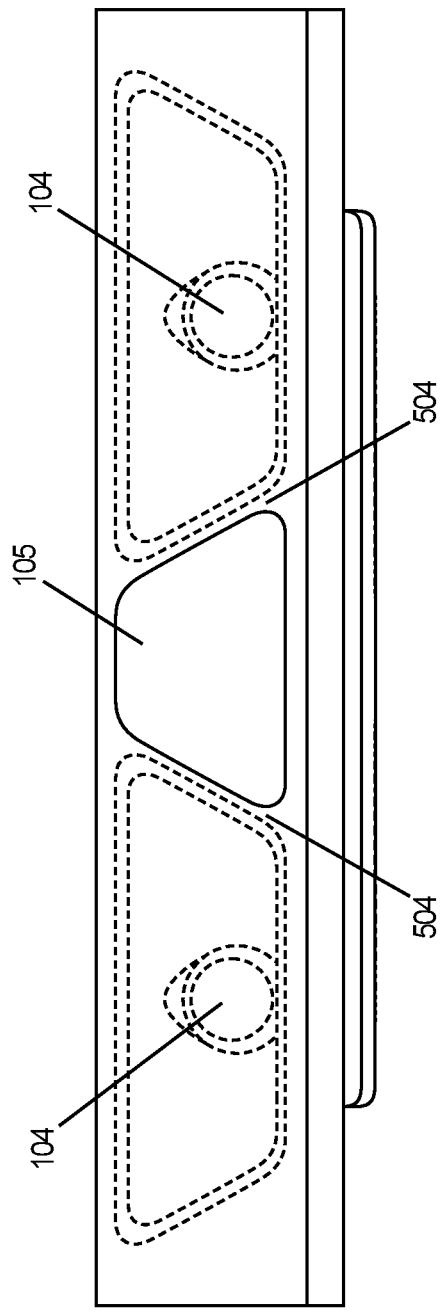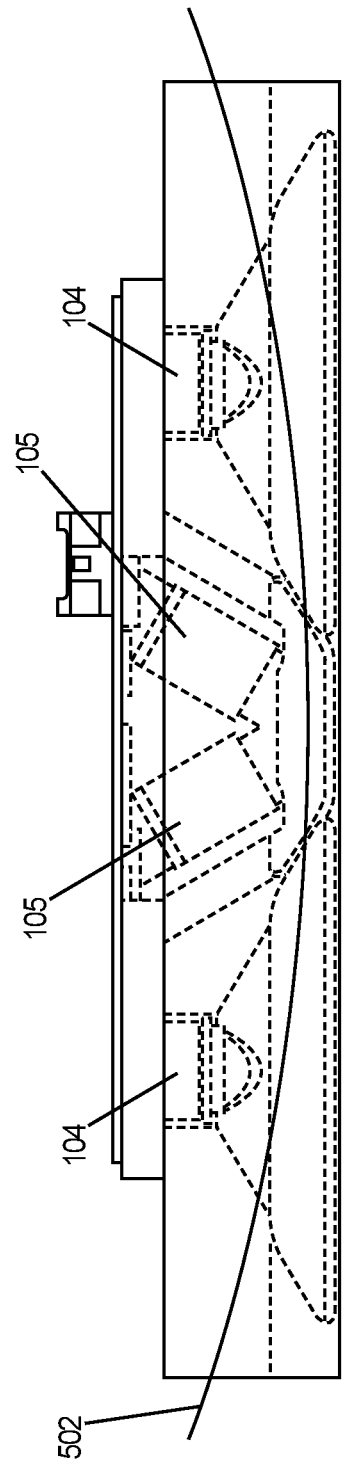
FIG. 5A
FIG. 5B

INTELLIGENT CLEANING ROBOT

RELATED APPLICATIONS

This application is a national phase filing under 35 U.S.C. § 371 claiming the benefit of and priority to International Patent Application No. PCT/US2018/066517, filed on Dec. 19, 2018, which claims the benefit of U.S. Provisional Patent Application Ser. No. 62/607,775, filed Dec. 19, 2017, U.S. Provisional Patent Application Ser. No. 62/620,898, filed Jan. 23, 2018, U.S. Provisional Patent Application Ser. No. 62/702,656, filed Jul. 24, 2018 and U.S. Provisional Patent Application Ser. No. 62/752,052, filed Oct. 29, 2018. The entire contents of these applications are incorporated herein by reference.

FIELD OF THE INVENTION

The present disclosure and claimed embodiments relate to a mobile wheeled robotic vehicle designed to navigate indoor environments, and, in particular, a vehicle acting as an intelligent cleaning robot, and controlling methods therefor.

BACKGROUND OF THE INVENTION

Examples of mobile cleaning robots, and, in particular, robots for use in the home, are well known in the art. Current models of robots are able to traverse a room to perform vacuum operations on carpeted surfaces or mopping operations on hard surfaces. Simple embodiments of home cleaning robots employ bump sensors and/or proximity sensors for obstacle avoidance. More advanced embodiments employ a single camera or other optical sensor for mapping an environment and determining location of the robot within the environment, typically utilizing a visual SLAM (simultaneous localization and mapping) method.

Several problems exist with even the more advanced embodiments of home cleaning robots. One problem is that they are unable to detect obstacles on the ground, such as to perform obstacle avoidance, without engaging with the obstacle, for example, by running into the obstacle and engaging a bump sensor on the device or utilizing a proximity sensor. Thus, the navigational capabilities and mapping capabilities of current state-of-the-art home cleaning robots is extremely limited. Given a region, a typical home cleaning robot will traverse the region in such a manner that some areas of the region will be covered multiple times while other areas of the region will be completely missed.

SUMMARY OF THE INVENTION

Described herein is an intelligent autonomous cleaning robot for domestic use. The robot autonomously maps and cleans multiple rooms in a house in an intelligent manner. The described embodiments include hardware and software for sensing the environment, planning actions, and executing actions.

The intelligent cleaning robot uses stereo cameras with a static projected light pattern to generate 3D data used for the purposes of mapping, localization, and obstacle avoidance. The system also uses optical sensors in various locations around the robot for additional sensing for mapping, localization, and obstacle avoidance. One embodiment of the robot uses laser light striping paired with a vertically positioned camera at the front corners of the robot facing backwards (similar to side mirrors in a car) for additional 3D data for mapping, localization, and obstacle avoidance. Another embodiment of the robot uses a downward facing camera housed within the robot that tracks features on the ground, providing visual odometry from which a motion estimate that is independent of wheel slip may be derived.

The front facing stereo camera uses a static projected light pattern that is pulsed and can alternate with a uniform light pattern. The front facing stereo camera can also track features to perform visual odometry and provide a motion estimate independent of wheel slip. The system also uses multiple time-of-flight (ToF) laser distance sensors oriented in various directions for cliff detection, wall following, obstacle detection, and general perception.

The base station for the intelligent cleaning robot uses a beacon to allow the robot to identify the bearing and presence of the base station. IR (infrared) illuminated patterns on the base station allow the robot to identify orientation and location of the base station, which allows for autonomous docking. The orientation and location are also used for mapping and localization. The robot can also use patterns on the base station and/or the known physical shape of the base station for the purposes of calibrating the stereo cameras.

BRIEF DESCRIPTION OF THE DRAWINGS

FIGS. 5A-5B show the stereo module housing the stereo cameras and pattern projectors.

DETAILED DESCRIPTION

The term microcontroller, as used herein, may mean a dedicated hardware device, circuitry, an ASIC, an FPGA, a single or distributed microprocessor(s) running software or any other means known in the art. It is further understood that the microcontroller will include connections to sensors, active light sources, motor controllers and audio/visual output devices for receiving data, sending control signals and providing user feedback. The invention is not intended to be limited to one method of implementing the functions of the controller.

As used herein, the terms camera and sensor are used interchangeably.

A robot suitable for domestic or commercial floor cleaning functions is described. The robot body may comprise a chassis having a longitudinal axis in a fore/aft direction and a transverse axis oriented perpendicular to the longitudinal axis. The body, from a top view, may be round in shape, square or rectangle or in shape, or a combination of both. For example, the front of the robot may be squared off, while the rear of the robot is rounded. Preferably the profile of the robot will be as low as possible to allow it to navigate under objects, such as furniture. The robot will be fitted with a motive system for generally moving the robot along the longitudinal axis. The motive system may comprise, for example, motor driven wheels mounted on opposite sides of the robot and a caster wheel supporting the front of the robot. In alternate embodiments, the motive system may comprise treads mounted on opposite sides of the robot (also referred to herein as wheels). The robot may be fitted with a vacuum system and one or more rotating brushes. The brushes may be oriented such as to rotate along an axis parallel to the transverse axis or may be oriented to rotate about an axis orthogonal to both the longitudinal axis and the transverse axis. The robot may be fitted with a series of sensors of various types, as described herein, for performing localization, object detection, mapping, etc. A microcontroller and memory storing software and mapping data may be provided. The microcontroller may control the robot in accordance with instructions implemented in the software, including, for example, controlling the motive system, determining routes, reading and processing data from the sensors, etc.

Figure 1:
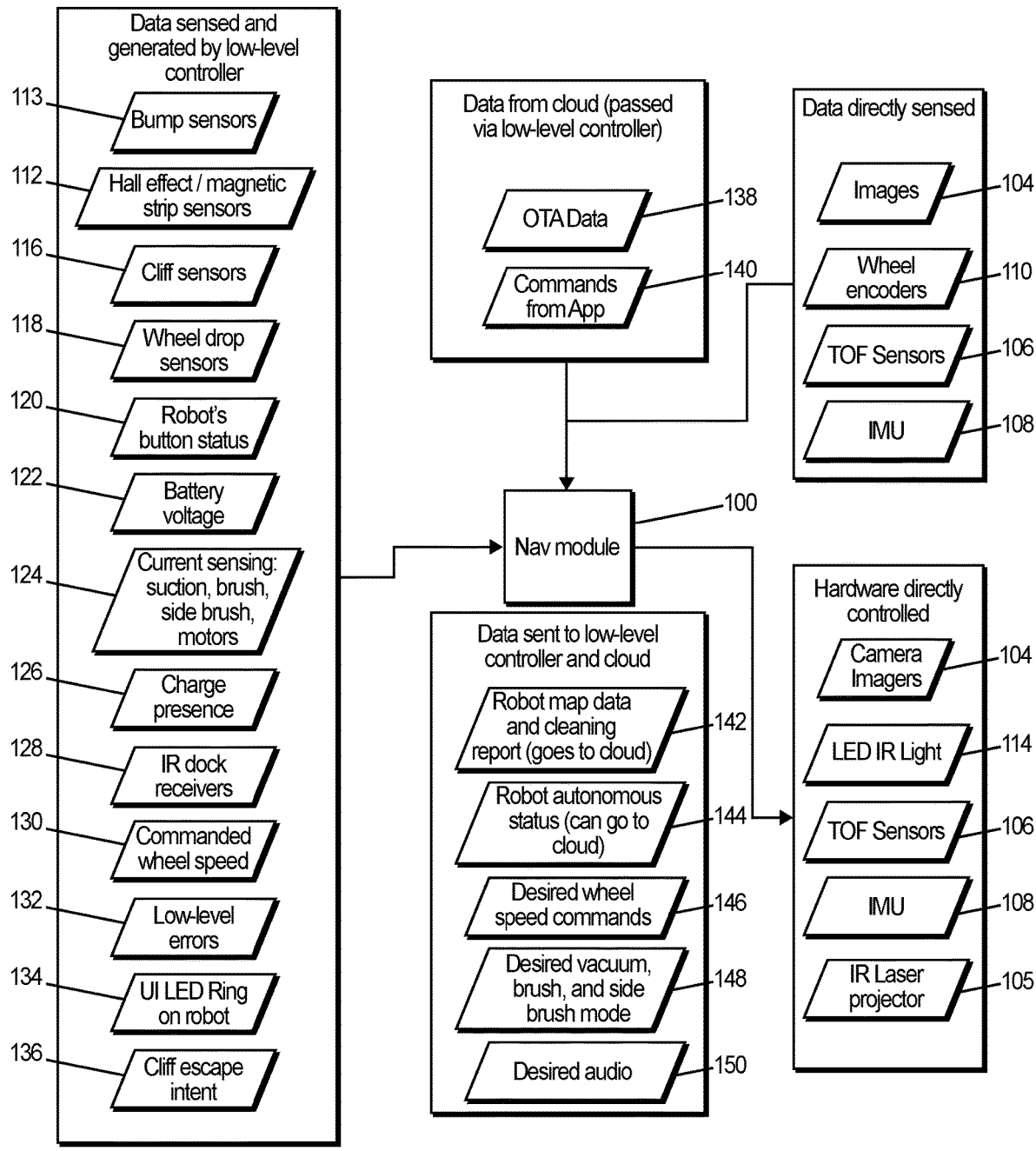
FIG. 1 is a block diagram of the system layout of the embodiments described herein.

FIG. 1 is a block diagram of the hardware components of the device. Navigation module 100 interfaces with various components, including sensors for collecting data regarding the environment, motor controllers for controlling the navigation and cleaning features of the robot and audio and/or visual indicators to provide feedback and status information to users. Navigation module 100 is also responsible for processing all sensor data collected from the sensors of the robot and running all control algorithms for the robot, including a mapping and localization.

Stereo cameras 104 are positioned at the front of the robot, as shown in FIG. 5A, and may be used for collecting images. The images may be used for capturing 3D depth data and video regarding the environment, and for detecting the dock. The robot may also be equipped with a pattern projector 105 to provide additional textures for stereo vision and a visible or infrared light source 114 to useful for illuminating the scene such as to be visible by the imagers with diffuse IR light. IR light source 114 is also useful for dock detection and for providing general scene illumination.

In a preferred embodiment, multiple camera types can be used in in the stereo configuration. Preferably stereo cameras 104 are RGB/IR imagers having pixels that are sensitive to only visible (red, green and blue specific pixels) spectrum and also pixels which are sensitive to only infrared (IR specific pixels) spectrum, to allow the projection of a pattern in infrared such as not to be visible to the naked eye. The RGB/IR type of camera allows the capture of color (RGB) and IR data simultaneously. Preferably the infrared pixels will be used for 3D mapping while the RGB pixels will be used for visual odometry and other techniques which rely on visible light, for example, place recognition, object rate recognition, object classification and floor type recognition.

In alternate embodiments, the stereo cameras 104 may also be monochrome, having pixels that are sensitive to visible and IR, but unable to discriminate between both. Additional filtering may be used to limit the sensitivity to only visible or IR. Color cameras may also be used, which have RGB sensitive pixels. In some cases, the pixels in the color camera can also be sensitive in the interim infrared spectrum.

In a preferred embodiment, one or more laser modules are used as the active stereo illuminator 105 to project the random pattern. Preferably, the one or more lasers (with diffractive optical elements) are oriented such that their combined fields of view cover an entire 120° field of view. In preferred embodiments, two lasers with 60° fields of view are used. The overlapping patterns are shown in FIG. 7B, with the field-of-view of the left camera shown as 708a and the field of view of the right camera shown as 708b. The overlapping field-of-view 708c of the left and right cameras is the region where the 3D depth data is calculated using a stereo vision algorithm. The active stereo illuminator 105 may produce various patterns including, for example, a random dot pattern, a cross pattern, a multiple lines pattern etc. A coarse random dot pattern projected by the multiple laser modules may be preferred as it allows for reliable detection of surfaces at oblique angles. Finer dot patterns are undesirable because multiple dots may be perceived as merged together, thus reducing texture.

In some embodiments, the robot may also be equipped with a visible and/or an infrared light source 114 to illuminate the scene. Preferably, the visible and infrared light sources would be white and IR LEDs respectively. The visible infrared light sources may be housed in close proximity to the stereo cameras 104 and active stereo illuminator 105 and may be positioned to point in a generally forward direction.

Several strategies exist for cycling both the active stereo illuminator 105 and the visible and infrared illuminators 114. In one embodiment, the dot pattern projection and diffuse IR illumination may be alternated. The dot pattern augments the scene by adding texture to the scene, in the form of the random dot pattern. The diffuse IR illuminator illuminates the scene without adding features that move with the robot, which may mislead visual odometry or tracking algorithms. In an alternate embodiment the diffuse visible/infrared illuminator 114 would be kept on when needed, for example, in a dark environment or under furniture, and the pattern projector 105 would be cycled on and off with a specific pattern, for example, odd or even video frames. In yet another embodiment, the diffuse visible/infrared illuminator 114 is kept on when needed and the pattern projector 105 is cycled on or off as needed (as determined by the software algorithm which controls the pattern projector) instead of in a repeating pattern.

Preferably, stereo cameras 104 and pattern projectors 105 are mounted in a housing which is positioned at the front of the robot, as shown in FIGS. 5A-5B. Optionally, the visible/infrared illuminators 114 may be mounted in the same housing. Preferably, stereo cameras 104 may be covered with a lens cover which is transparent to visible and infrared light, while the active stereo illuminator 105 may be covered with a filter which blocks visible light that allows IR light to pass. It is also important to note that internal sidewalls 504 are necessary to block reflections off of the inside cover from the active stereo illuminator 105 to stereo cameras 104.

Figure 6A:
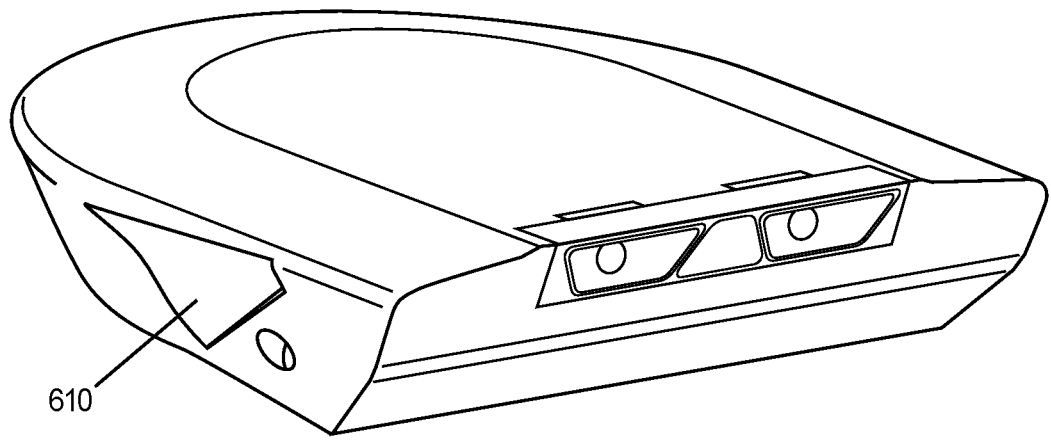
FIGS. 6A-6B show two possible form factors of the intelligent cleaning robot.
Figure 6B:
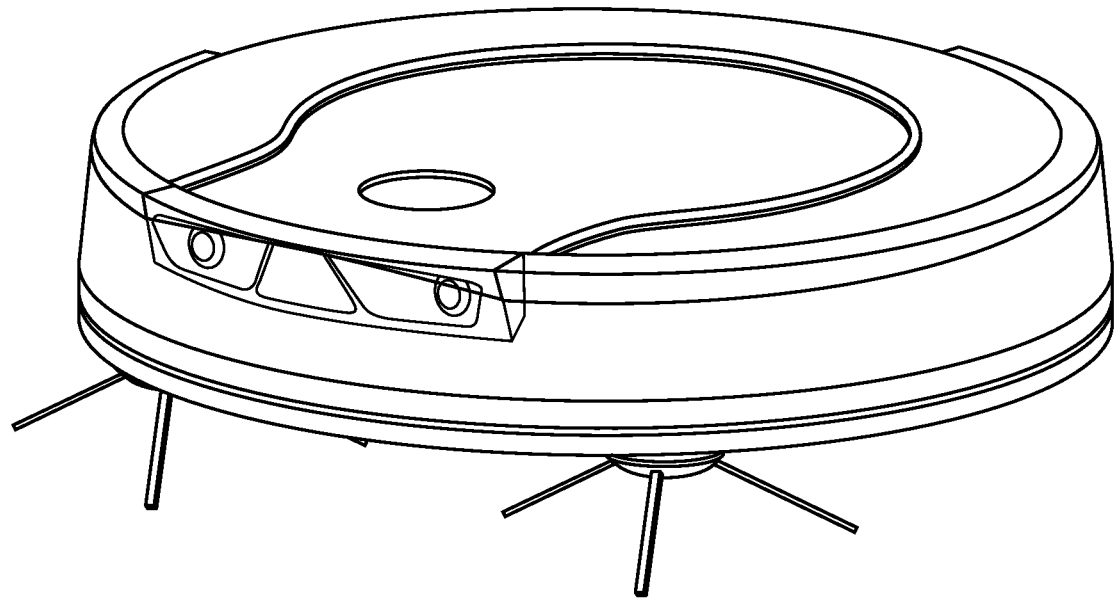

The cleaning robot may come in different form factors, as shown in FIGS. 6A-6B. FIG. 6A shows a form factor having a rounded rear portion and a squared off front end portion, while FIG. 6B shows a form factor having a completely round profile. Note that, in the event that the robot has a rounded profile, the swept cover shown as line 502 in FIG.

5B may be used to cover the stereo camera 104 and active stereo illuminator 105, as well as the optional visible and infrared light sources 114. Other form factors are possible.

Figure 7A:
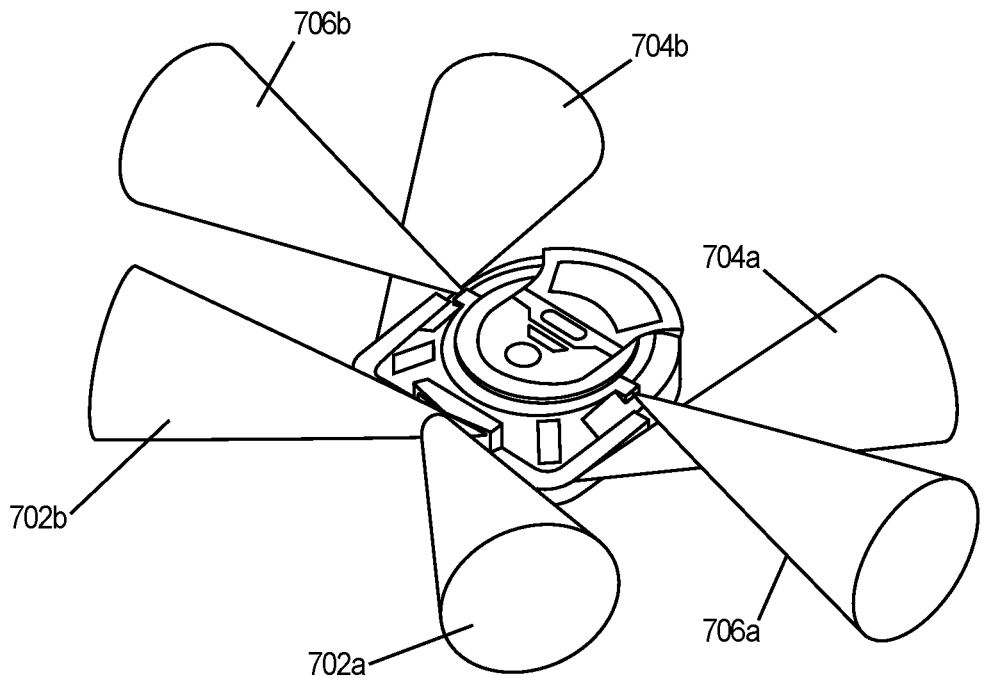
FIGS. 7A-7B show the fields of view of the side mirror cameras, the front stereo cameras, and the range sensors.
Figure 7B:
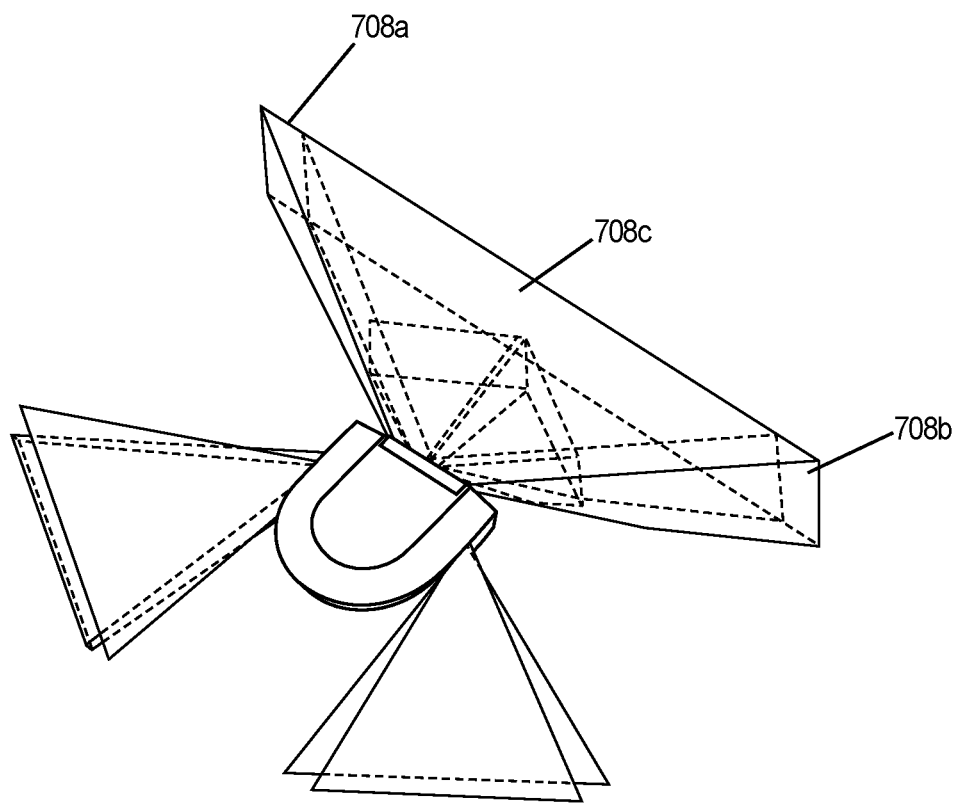

FIGS. 7A-7B show the fields-of-view of rangefinders 106. As shown in FIG. 1, rangefinders 106 are distributed around the robot to provide ranging information for localization, mapping and obstacle detection. In a preferred embodiment, the rangefinders 106 are time-of-flight (ToF) sensors. Preferably the sensors 106 are tilted upwardly to mitigate sensing bias returns from the floor. In one embodiment, there are six range finding sensors distributed around the robot, as described below. In an alternate embodiment, only four range finding sensors may be used.

Preferably two of the range sensors 106 form a crisscrossed pair at the front of the robot. These sensors maybe mounted in the same housing as stereo cameras 104 and active stereo illuminator 105 and their fields-of-view are shown in FIG. 7A as reference numbers 702a and 702b. The rangefinders 106 may provide inputs for wall following and side mapping and may also serve as a redundant forward bumper.

An additional pair of rangefinders having fields-of-view shown in FIG. 7A as 704a and 704b may be mounted on the side of the robot in a "rearview mirror position", that is, pointing rearwardly as with the side rearview mirrors of a car.

An optional third pair of rangefinders, shown by having fields-of-view shown in FIG. 7A as reference numbers 706a and 706b may be provided in a side-facing, over-wheel position. These rangefinders may be useful for wall or corner following.

Figure 9A:
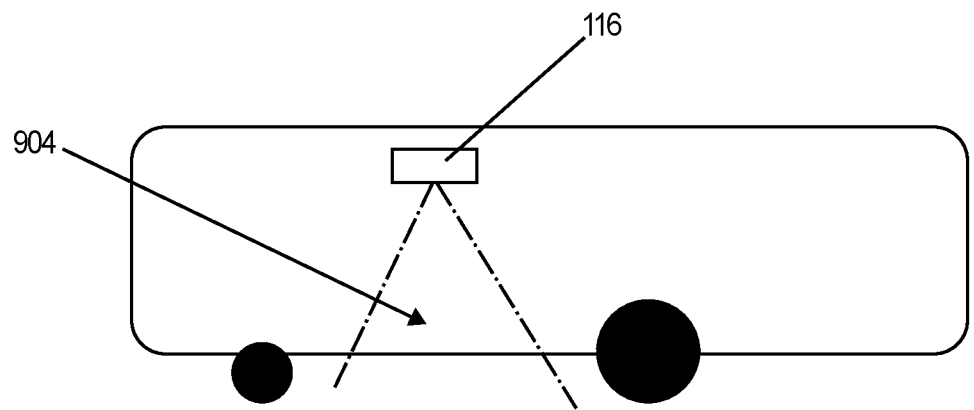
FIGS. 9A-9B show a view of the belly camera.
Figure 9B:
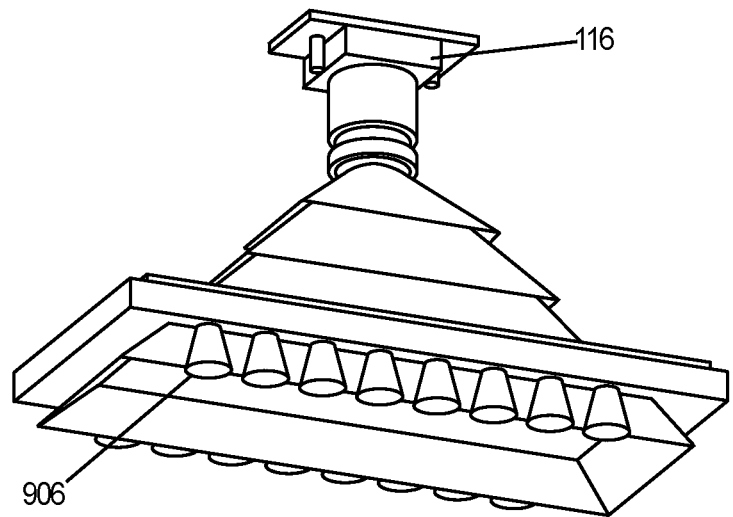

In some embodiments, the robot may also optionally be provided with a proximity sensor 116 for cliff detection. The proximity sensor 116, as shown in FIG. 9A, may be a camera which tracks features on surfaces to estimate movement and to perform cliff detection, if the robot should navigate to the edge of a floor. Preferably, camera 116 will be positioned within the body of the robot to maximize its height off of the ground and will include lenses providing a 60° to 120° horizontal field-of-view 1004. As shown in FIG. 9B, proximity sensor 116 may also be provided with illumination in the form of an array of LEDs 906 positioned to illuminate the floor surface.

In other embodiments, the robot may also optionally be provided with side cameras, as shown in FIG. 6A as reference number 610, with the fields-of-view for the side cameras 610 shown in FIG. 7A as 704a and 704b. The front stereo cameras 105 have a sufficiently wide field-of-view to sense features on the sides and are adequate for mapping objects in the front of the robot. However, tasks such as chair leg following would have to be done blindly by dead reckoning, using existing map data. Preferably, the vertical field-of-view of the optional side cameras would be tilted downward. The optional side cameras may be used in conjunction with or in lieu of the side facing rangefinders.

Preferably, the robot will be equipped with an inertial measurement unit (IMU) 108 to measure the motion of the robot inertially, consisting of at least 6-axes, 3-axes of gyros to measure rotation and 3-axes of accelerometers to measure translation. IMU 108 provides can be used to provide an estimate of 3D acceleration, 3D rate of rotation, and 3D magnetic fields, and elevation. This is used for estimating attitude/orientation, and for estimating wheel slip. Optionally, an additional 3-axes magnetometer 112 may be used to measure the magnetic field. Magnetometer 112 may be, in some embodiments, a Hall Effect or magnetic strip sensors and may be used to indicate the presence of a magnetic field. This is useful for identifying the presence of a magnetic strip used to partition areas where the robot should not navigate.

Additional embodiments include wheel encoders 110 to measure the translational speed of the robot. In preferred embodiments, each wheel may be equipped with an encoder to maximize accuracy and to allow measurement of direction by the difference in the wheel speeds. Wheel encoders 110 may provide signed (typically quadrature) or unsigned tick count of wheel or wheel motor rotation, which is useful for calculating estimated translational velocity and for determining wheel slip.

Additional sensor data and data generated by a low-level controller are used as inputs to the navigation module 100.

Bump sensors 113 provide data indicating when the robot bumper depresses, usually as a result of contacting an object.

Cliff sensors 116 provide data indicating a vertical drop that could be hazardous to the robot. Cliff sensors 116 can be time-of-flight (TOF) or proximity sensors. Cliff detection events are used as input to the robot's map, so the robot does not repeatedly go near cliffs.

Wheel drop sensors 118 provide data indicating if a wheel (typically on a spring-loaded suspension) moves away from the robot body, typically indicating that the wheel is no longer in contact with the ground.

Robot button status 120 indicates what button the user has pressed on the robot and may be used to change the state of the robot, for example, from idle to cleaning, or cleaning to dock.

Battery voltage data 122 provides data regarding the charge level of the robot's battery. This is used to trigger return to dock behavior when the level drops below a specified threshold. Additionally, the level can be combined with an estimate of charge needed to traverse the path back to the dock.

Current data 124 provides information regarding the electrical current used by the suction, brush, and side brush motors. The brush current and side brush motor current can be used, in some embodiments, to estimate the type of floor the robot is on. Current data 124 can also be used to estimate the amount of slip the wheels could experience by correlating current with floor type and slip models.

Charge presence data 126 indicates if the robot is on the docking station, which provides charging for the battery. This is useful for detecting that the robot has successfully docked for the purposes of charging.

IR dock receiver data 128 provides an indication of the presence of an encoded IR signal emitted from the dock. This is used to help approximate the dock's location when the robot is navigating to the dock.

Commanded wheel speed data 130 comprises desired wheel speed commands 146 sent by the navigation module to a lower-level controller for a desired speed.

Low-level error data 132 indicates if a low-level controller has detected any errors, which may include, but is not limited to, critical battery level, over-current conditions, cliff detection events and wheel drop events.

Light ring 134 is a part of the user interface of the robot and is used to communicate status to the user.

Cliff escape intent data 136 allows a low-level module to communicate intended motions for escaping a cliff event to the navigation module 100.

Over the Air (OTA) data 138 is a data package which may be received wirelessly that can be used to update the low-level controller and/or the navigation module software.

Commands from App 140 allows the user to send commands to the robot, which may include, but are not limited to clean, dock, or stop, in addition to setting cleaning aggressiveness, querying for robot location, or querying for robot map. Commends from App 140 may be generated by an App running on a mobile device.

Robot map data and cleaning report data 142 provides grid map and/or vectors describing the environment previously mapped, cleaned, and navigated through by the robot. Robot map data and cleaning report data 142 may also include statistics on how much area was cleaned.

Robot autonomous status 144 indicates if the robot is cleaning, exploring, idle, docking, etc.

Desired vacuum, brush, and side brush mode data 148 allows navigation module 100 to request that a low-level controller turn on/off or modify the intensity of the vacuum, brush, and/or side brush.

Desired audio 150 allows navigation module 100 to request a low-level module playback audio over the robot's speaker.

Figure 2:
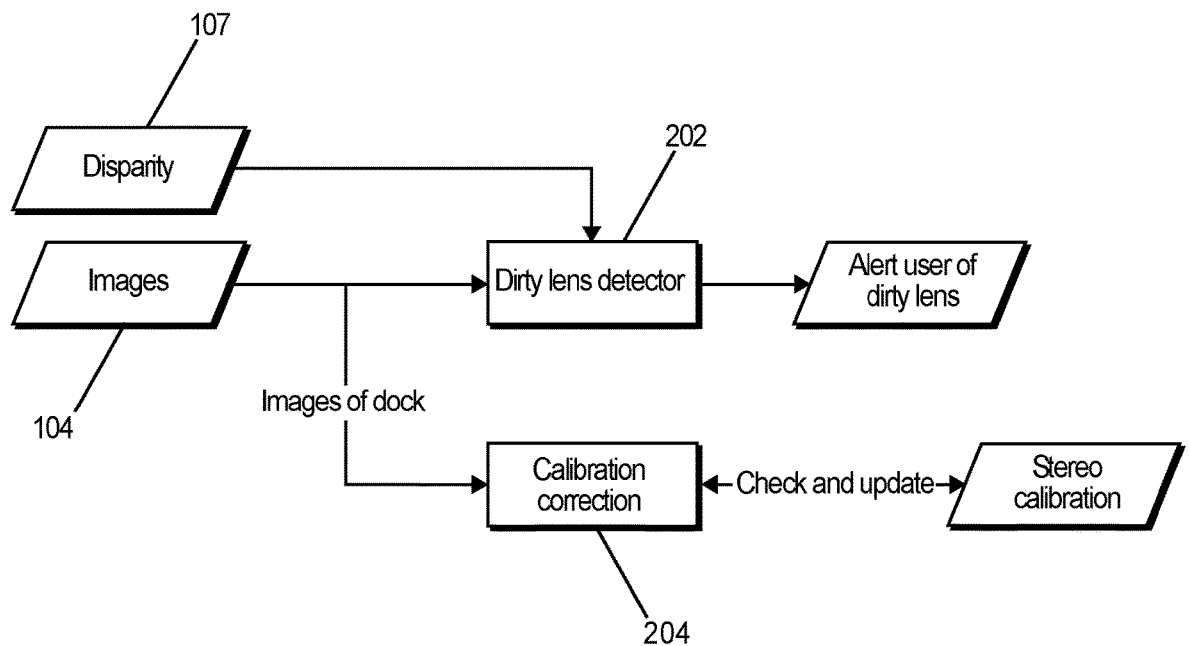
FIG. 2 shows miscellaneous functions performed by the navigation module.

FIG. 2 shows miscellaneous functions performed by navigation module 100. A dirty lens detector module 202 uses the images 104 and disparity 105 and compares with expected images and disparity of the dock to try and determine if the lens or lens cover is dirty and requires cleaning. The images are typically taken when docking/undocking but could be of any object that has repeatable/reliable appearance and/or disparity information.

The calibration correction module 204 uses images 104 and disparity 107 of the dock to correct potential errors in calibration. The module can use disparity data 107 to determine if the dock (which has known dimensions) has the expected dimensions sensed from the disparity information. If the error is greater than a threshold, then the module can use the images to adjust the principal point of each stereo imager to optimize correlation of feature points and to match the expected geometry of the dock. This calibration/adjustment could also occur whenever the dock is visible irrespective of any error detected.

Figure 3:
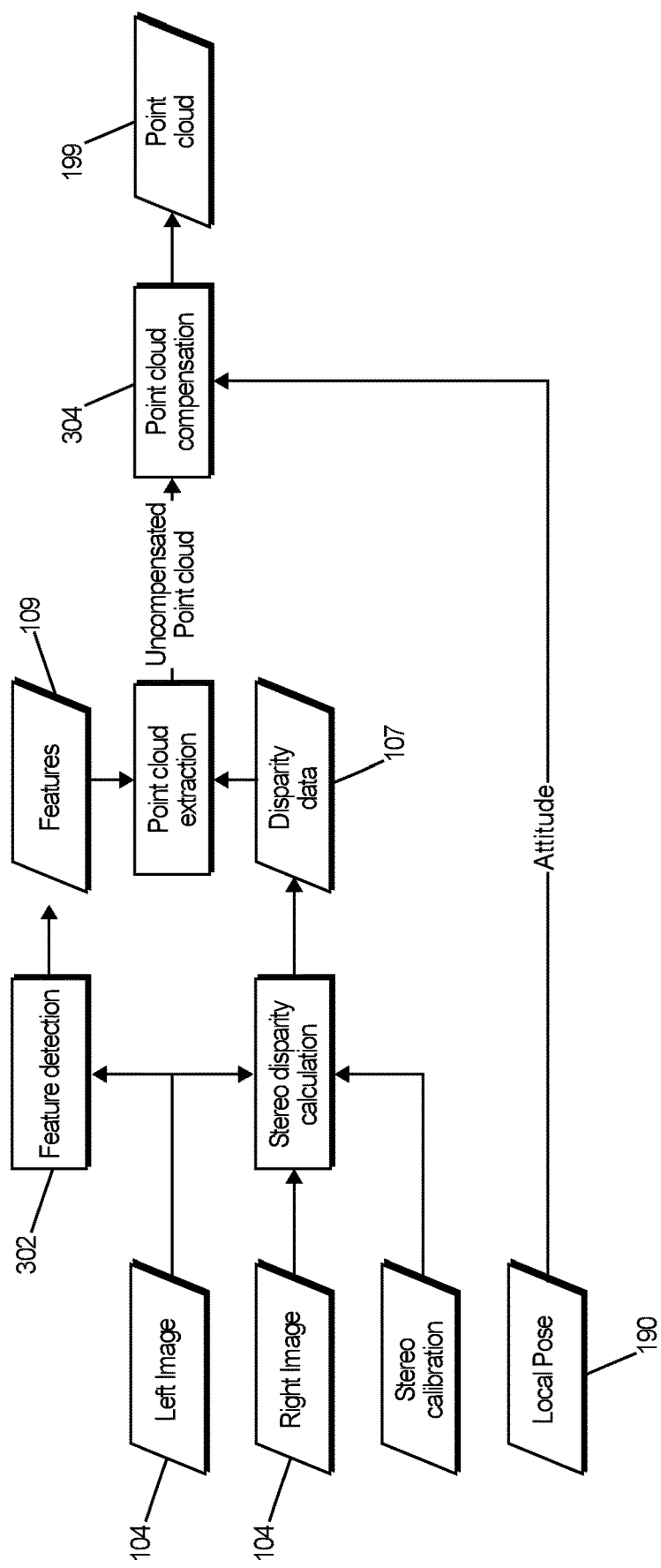
FIG. 3 shows the process for creating a point cloud.

FIG. 3 shows the flow of some of the functionality the navigation module 100 performs with the images to create a point cloud 199. The module uses the stereo calibration and calculates the stereo disparity using the two images 104. One image (in this case the left image) is used by a feature detector 302 that identifies features in the image. Point clouds 199 are calculated from the disparity data 107 and the feature locations 109 detected by feature detector 302. Presumably, feature locations 109 should have more accurate/reliable disparity information. The point cloud 199 can be calculated through a variety of filters: 1×1, 2×2, 3×3, etc., or an X pattern (2-1-2). The uncompensated point clouds are then adjusted at 304 using the attitude information from local pose 190. Alternatively, the point cloud 199 can be compensated for during the disparity calculation by modifying the calibration with the attitude from local pose 190.

Figure 4:
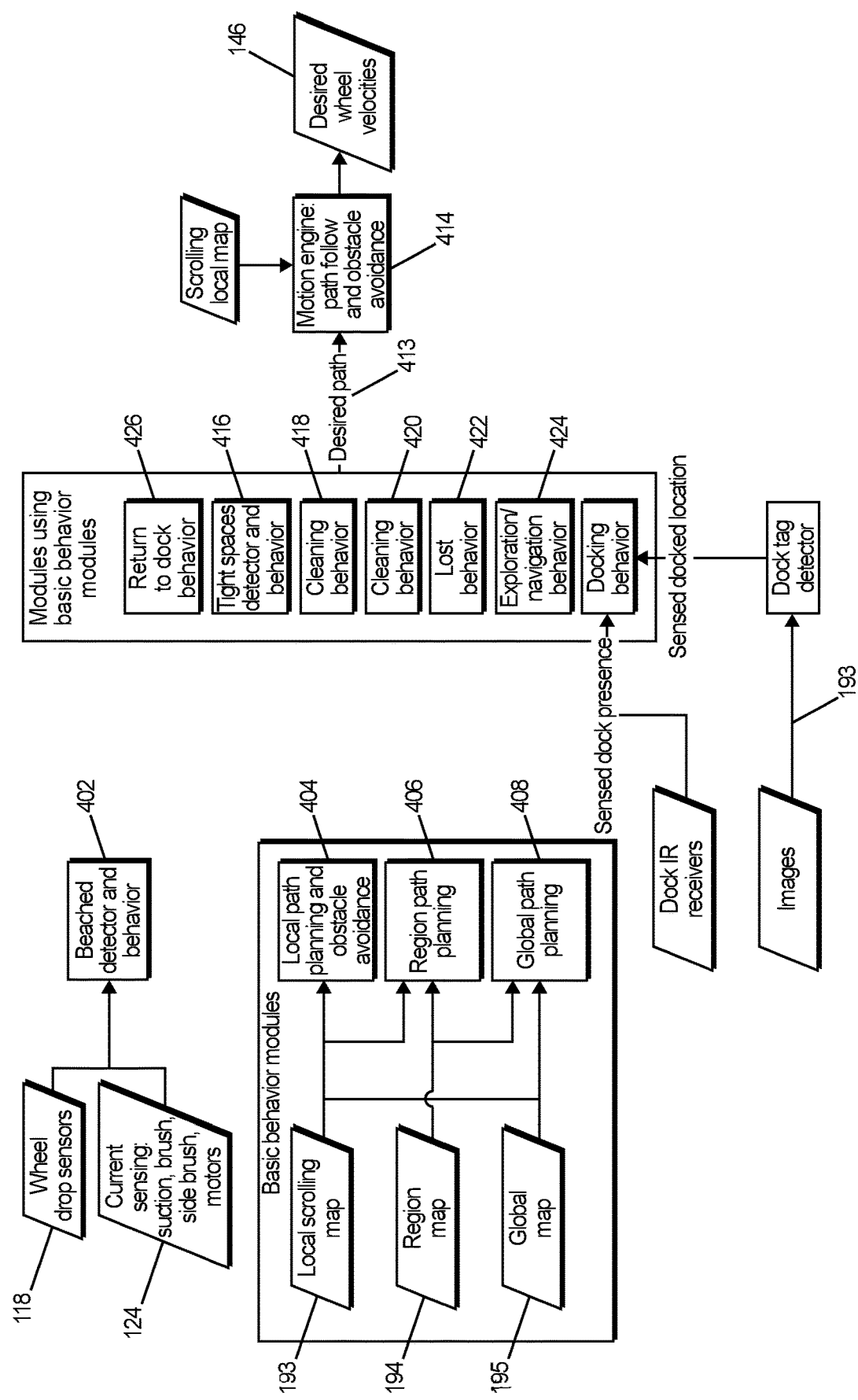
FIG. 4 shows the behavior flow of the navigation module.

FIG. 4 shows the behavior flow of the navigation module 100.

Wheel drop sensors 118 and current sensors 124 allow the navigation module 100 to determine, at 402, if it is beached or stuck on an object. One way of detection is to observe when motor currents from the wheels goes very high for a longer than normal period of time. Once detected, navigation module 100 performs an escape motion to move away from the suspected location of the object. Additionally, navigation module 100 can add the location of the object as a potential obstacle to the robot's map. The module uses the location of the object based on the beginning of the interaction.

Local path planning module 404 uses local grid maps 193. Regional path planning module 406 uses regional maps 194 and local maps 193. Global path planning module 408 uses global maps 195, regional maps 194, and local maps 193.

Once a desired path 413 is created by a module, the motion engine module 414 sends wheel speeds commands 146 to attempt to get the robot to follow the desired path while using a local scrolling map to avoid obstacles.

A tight spaces module 416 detects when the robot is in confined space. This typically occurs when the path planner cannot find a free path away from a small area. The module proceeds to use the bumper sensors 113 and rangefinders 106 to find a way out, interpreting the local map as untrustworthy.

A perimeter behavior module 418 controls the robot motion to go around the perimeter of a region to map the region. The behavior tends to be conservative when avoiding obstacles or following walls. This generally helps minimize interacting with obstacles. The perimeter behavior attempts to complete a loop of the region. When making a perimeter, the module attempts to make a perimeter around only areas that have not been previous cleaned. The module limits the size of the region it makes a perimeter around to a maximum dimension. The perimeter behavior attempts to identify the type of surface the robot is on more often than when cleaning. The perimeter behavior attempts to use natural barriers (like walls or doorways) to help define the perimeter it creates.

The cleaning behavior module 420 controls the robot motion when cleaning a region. The robot attempts to clean an entire region before exploring to find other regions to clean. The cleaning behavior module 420 attempts to create a cleaning pattern consisting of parallel lines that are also parallel/perpendicular to the area's principal direction (result is typically seeing cleaning paths that are parallel to walls). If the robot cannot get to an area it thinks it should be able to clean (typically due to bumper hits, cliff detection, or magnetic strip), then it marks the area as inaccessible and no longer attempts to clean the area.

The lost behavior module 422 detects when the robot is lost and controls the robot motion when lost. When lost, the robot will first attempt to re-establish positioning/localization in place. Next, the robot will execute a path that moves the robot around to try and re-establish positioning/localization. Finally, the lost behavior module 422 will switch the robot to a behavior that attempts to re-explore the environment to try and find the dock and then return to the dock.

The exploration and navigation module 424 directs the robot to areas that have not been cleaned or had a perimeter created.

The return to dock and docking module 426 monitors the battery voltage 122 to determine if the robot should return to dock based on a simple voltage threshold, or by periodically planning a path back to the dock and estimating the amount of charge needed to return to dock to trigger a return to dock behavior. The return to dock and docking module 426 will plan a path back to the dock and re-plan if needed. If the dock is not in the expected location, the return to dock and docking module 426 will control the robot to explore in the area nearby the expected location to try and acquire the dock position (usually using the IR dock receivers). Whether from IR dock receivers or the dock being in the expected location, the return to dock and docking module 426 turns off the projected laser projector 105 and uses the IR LED illumination 114 to illuminate the dock, which preferably has a retroreflective tag behind IR transparent material. The return to dock and docking module 426 then uses features from the tag to determine the dock location, which is used for guiding the robot back to the dock. The robot stops attempting to dock once the charge presence 126 is detected and consistent.

Figure 8A:
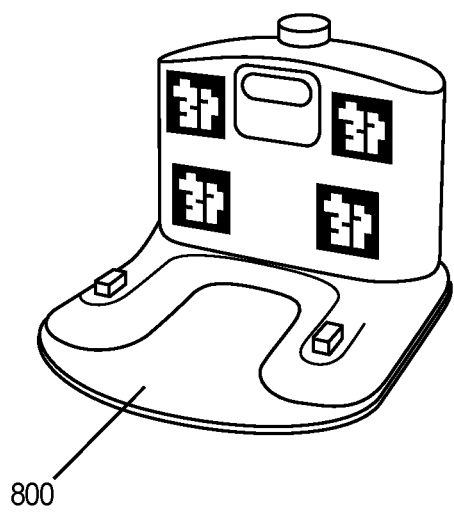
FIGS. 8A-8C show various aspects of the docking station.
Figure 8B:
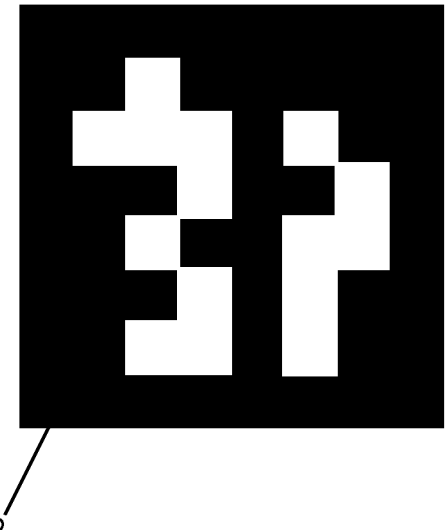
Figure 8C:
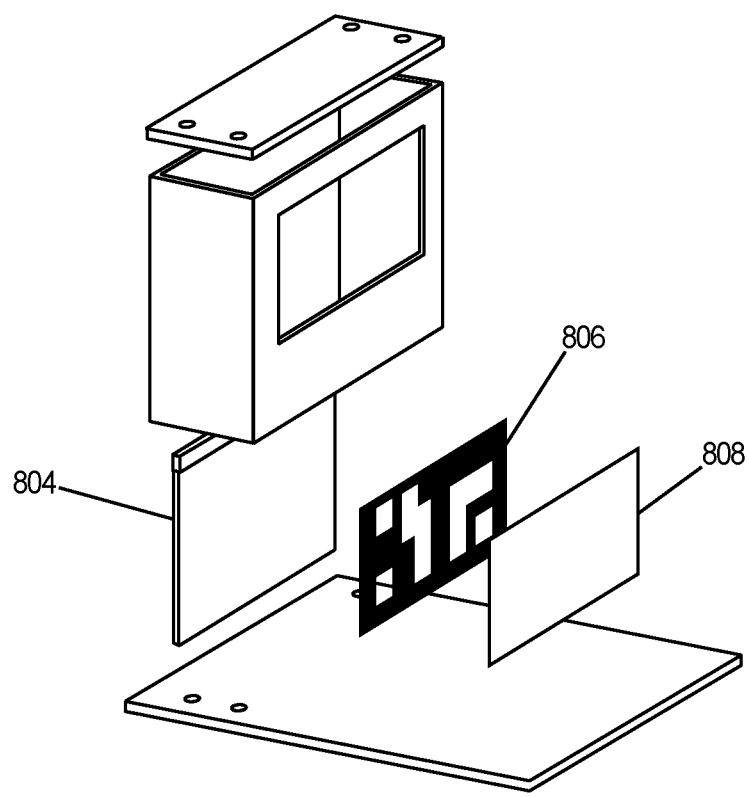

FIGS. 8A-8C show the docking station for use with the robot. Besides being utilized as a resting point for the robot and to recharge the batteries within the robot, docking station 800, shown in FIG. 8A, can also be used to calibrate certain features of the robot. For example, stereo camera 104 may become misaligned after a misalignment-inducing event. Preferably, base station 800 is fitted with one or more fiducials 802, for example an AprilTag, as shown in FIG. 8B, or other similar 2D barcode, LED lights, a text/logo, an IR retroflector pattern or an IR backlit pattern. The preferred embodiment uses a fiducial 802 or pattern to allow the robot to identify the base station 800. The fiducial 802 has the advantage of being robust and accurate, however, has a disadvantage of being unsightly. In a preferred embodiment IR backlighting may be used to illuminate the fiducial 802. This has the advantage of being active and therefore easy to detect, provides good information for calibration, and is invisible to a human. Additionally, in a preferred embodiment, fiducials 802 of different sizes may be used to allow for detection of the fiducials 802 at varying distances. Larger targets provide information for tracking while farther away, while smaller targets provide the reference points needed for higher accuracy pose estimation at distance closer to the dock.

FIG. 8C shows the docking station 800 in exploded form. The docking station 800 may be provided with an IR backlight 804 over which and a blocking mask 806 is placed to provide a code readable by the robot. A sheet of transparent plastic 808 may be used to make the surface appear black.

The docking station 800 shown in FIGS. 8A-8C may be used to perform self-alignment or calibration of the cameras 104 on the front of the robot. Preferably, the docking station 800 would be fitted with a pattern 802 visible to the robot while docking. In some embodiments, the pattern 802 may be an IR backlit pattern, while in other embodiments, the pattern may be an IR reflective pattern. In either case, it is preferable but that the pattern not be visible by humans. The pattern may be used to align the two cameras 104 on the front of the robot, which may, over time, become misaligned in either the vertical or horizontal (or both) directions.

In a preferred embodiment, images of the pattern 802 may be taken by either or both cameras 104 during the docking process and may be used by the robot to calculate the extent of the misalignment of the cameras, which may then be compensated for by factoring in the misalignment when processing images from the cameras 104. In a preferred embodiment, the calculation of the compensation for the misalignment may be performed while the robot is charging, based on images taken will the robot is approaching the dock.

In alternative embodiments, the docking station 800 may be passive and recognizable to the robot via scanning of a logo which appears on the docking station. The logo may be recognized utilizing a sophisticated detection matching algorithm and the logo must have salient features, for example, corners. To make the pattern easily recognizable and visible to the robot, the pattern can have a backlight or be retroreflective. As an added feature, the pattern could be covered by an IR transparent material, make the pattern in visible to a human, but visible to the robot in the IR spectrum. The algorithms for recognizing the pattern are commonly available.

Figure 10:
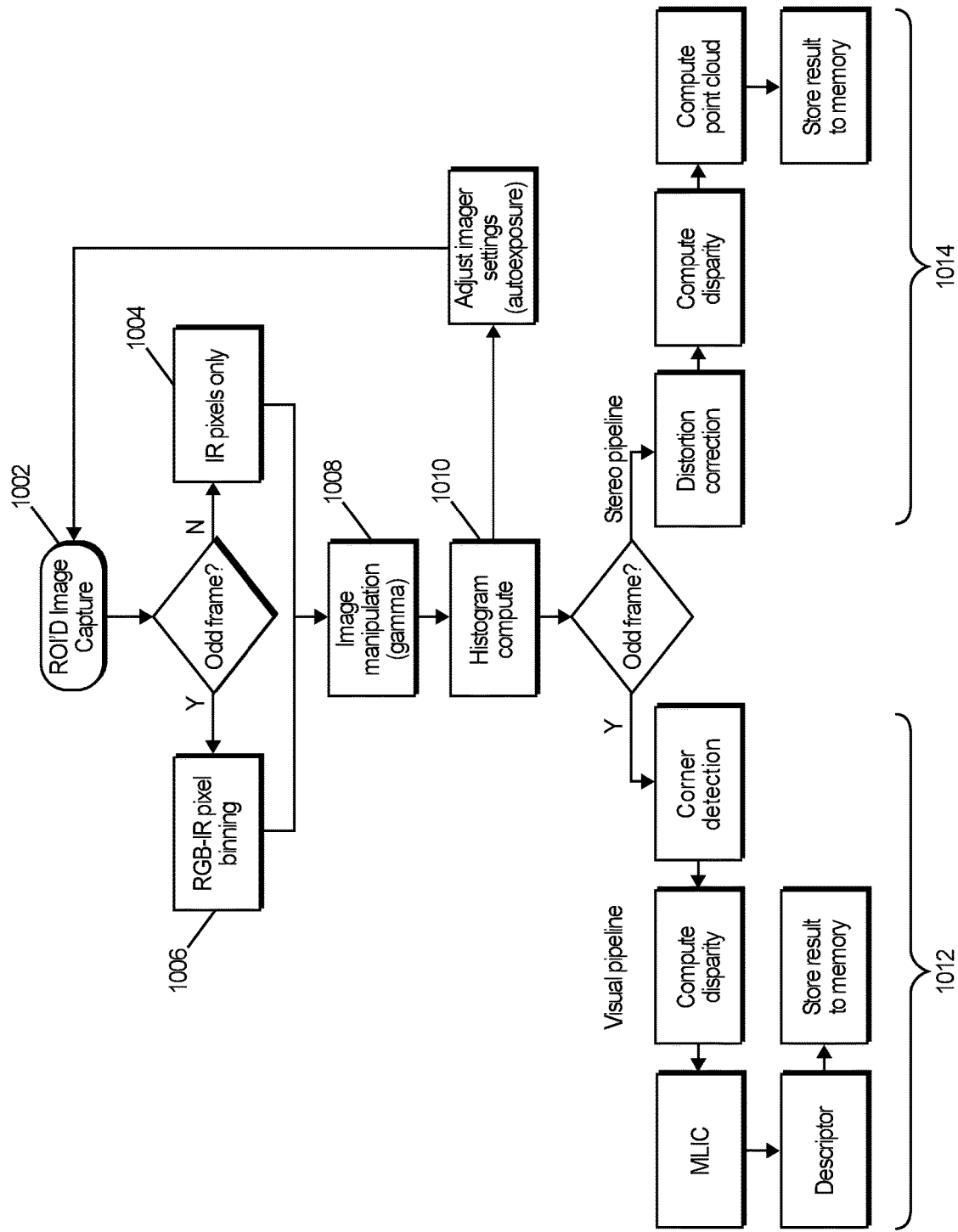
FIG. 10 is a flowchart for the imaging pipeline of the embodiments described herein.

FIG. 10 shows the process for capturing image data. Image data is captured with an ROI at 1002. Alternating frames are processed differently. For example, even frames may be processed with only IR data at 1004 while odd frames can be processed with all RGB-IR data at 1006. Both data go through gamma adjustment at 1008. A histogram 1010 is used for adjusting exposure of the imagers (auto exposure). RGB-IR frames are adjusted at 1012. A corner detector is used for feature detection and subsequent visual odometry operations. IR frames are adjusted at 1014 and are used for generating stereo disparity images and point clouds.

Figure 11:
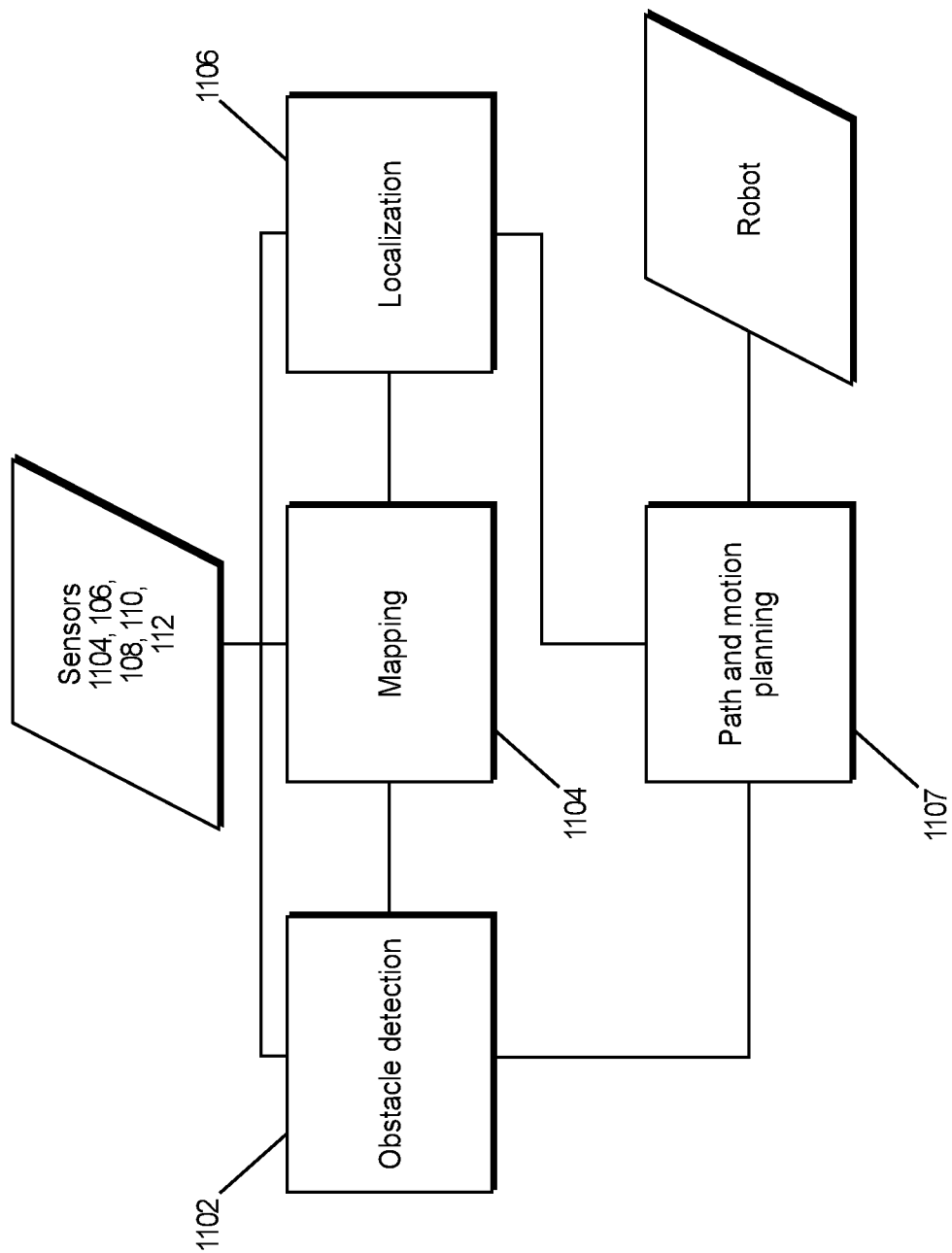
FIG. 11 shows the autonomy pipeline for performing obstacle detection and moving.

FIG. 11 shows a data pipeline allowing the intelligent cleaning robot to be autonomous, that is, able to map its environment, perform self-localization and perform obstacle detection without outside assistance. All algorithms for performing autonomous operation are executed by an onboard processing module. Sensors 104, 106, 108, 110, and 112, as described above, provide inputs to the modules required for autonomous operation. Obstacle detection module 1102, mapping module 1104, and localization module 1106 provide inputs to the path and motion planning module 1107 which control the robot.

Obstacle detection, performed by obstacle detection module 1102, can be accomplished with 2D and 3D data and can be calculated with data collected from the stereo camera 104 or from ToF rangefinders 106. The obstacle detection module 1102 can be used to perform the identification of small objects, for example, cords, Legos, pet messes, etc. through the use of color and shape. Machine learning may be used to perform the identification. The system can then use room designations to vary detection thresholds. For example, in the kitchen, a small yellow object may be identified as a Cheerio, whereas a small yellow object in the bedroom may be classified as a Lego. The system may adjust "shyness" or "cleaning aggressiveness" based on a user setting or which may be defined automatically by predefined room types. The cleaning aggressiveness setting would indicate which objects should be picked up by robot 100 or left as they are and avoided. The cleaning aggressiveness setting could also be used beyond obstacle classification to include other features, for example, modifying cleaning patterns and strategies. For example, in the kitchen or entryway, robot 100 may overlap cleaning areas to pick up more dirt, while in other areas there may be little overlap to improve efficiency. The aggressiveness setting could also be used to determine, for example, to run the brush roll at a higher speed or increase suction power.

Mapping module 1104, as shown in FIG. 11 is used to perform mapping of multiple rooms and/or regions and is discussed in more detail below. Localization module 1106 is able to self-locate robot 100 within the known map provided by mapping module 1104. Path and motion planning module 1107 plans a path for the robot to follow to provide an efficient coverage of the regions to be cleaned. In one embodiment, the robot runs "behaviors" most of the time (drive straight, circumnavigate obstacles, raster, etc.). Then, when the robot has no areas immediately around it that need to be cleaned, it plans a path to an uncleaned area and resumes running behaviors to clean the uncleaned portion.

Figure 12:
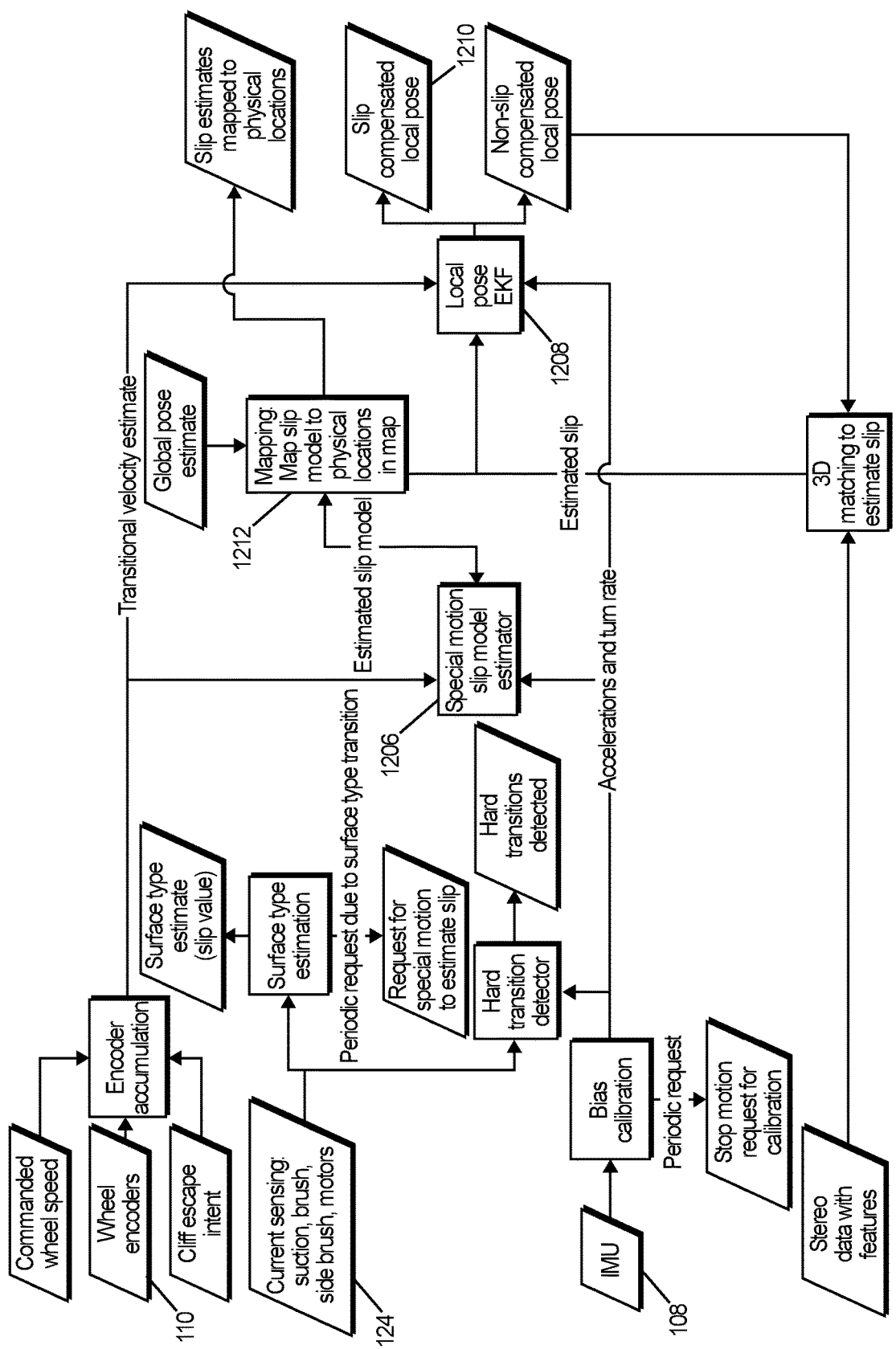
FIG. 12 is a block diagram of the local pose estimator.

FIG. 12 shows how local pose is calculated. The module uses motor current values 124 from the brush and side brush to estimate the floor type the robot is operating on. The module is trained using an SVM but could use any number of correspondence/prediction tools. The surface type is also represented as an estimated slip value. When the surface type changes, the module can request for a special motion to better estimate the slip at 1206. The module uses the acceleration and rate gyro information from the IMU 108 combined with current sensing from the drive motors, brush motor, and side brush motors 124 in a trained SVM to estimate when the robot goes over a hard transition (for example, a transition strip between different floor types). The module is trained using an SVM but could use any number of correspondence/prediction tools.

FIG. 12 shows a block diagram of the local pose estimator 1208 which is part of the localization module. The local pose estimator 1208 attempts to find a correspondence estimation amongst input data, which may comprise, for example stereo data collected from stereo cameras 104, point range data collected from rangefinders 106, line strip data and image data collected from all cameras. The reconciled data is then used in conjunction with odometry from wheel encoders 110, data from the IMU 108, visual odometry collected from cameras 104 and vision-based motion sensing collected from, for example, downward-facing belly camera 116, to estimate the local pose of the robot. The pose may include, for example, the robot's position within the known map and its current orientation in the environment. The slip compensated local pose estimate 1210 is then used to derive a global pose estimate.

FIG. 12 shows that one or more of the sensors can be fused together to calculate pose. The stereo cameras 104 can be used to calculate visual odometry, and visual odometry can also be run on a single camera (including downward looking camera 116). The 3D data and any 3D point information can be used to match to previous 3D data to calculate odometry. Odometry can also be calculated using the wheel encoders 110 and/or the IMU 108. All of these sensors can be fused together using an Extended Kalman Filer (EKF) at 1208 to calculate a slip-compensated local pose 1210.

Wheel odometry, which estimates position by measuring how far the drive wheels turn, is a common way to estimate translation and/or rotational movement of a vehicle, and, in particular, is especially effective with a differentially driven vehicle. Various surfaces may, however, cause this measurement to be an inaccurate representation of the robot's pose (translation and rotation). Inaccuracies typically result from wheel slip. For example, on a thick plush rug, the wheel odometry may indicate a translation of the robot 1.4 m, where the actual translation was only 1.0 m. Slip can be defined as the difference between the distance thought to be traveled by the wheels, based on odometry readings, and the actual distance traveled by the robot. Slip typically occurs on carpets or rugs were additional resistance occurs due to the caster wheel, the robot body, or the wheel interaction, typically from the sides when turning in place. Slip may also be caused by the wheels needing to move the fibers of the carpet or rug. It has been that found that slip on carpets or rugs typically has directionality. That is, the slip ratio changes depending on the direction of travel. Further, slip ratios vary between carpet types. The interaction of the carpet fibers with the wheels is different between carpet types. Independent of linear slip, some carpets have high lateral resistance while others have a much lower lateral resistance.

The wheel encoders 110, providing wheel odometry, are the primary sensor for measuring linear motion, whereas the IMU 108 is used primarily for orientation and heading. Slip results in an inaccurate estimate of linear motion when using the wheel encoders. The inaccurate estimate of linear motion leads to an inaccurate pose estimation and therefore inaccurate maps, positioning, motion control and obstacle avoidance.

One way to mitigate the effects of slip is to use other estimates of linear motion in addition to the wheel odometry. Scan matching matches a point cloud 199 generated from the stereo data to prior point clouds, typically lagged between 100 ms and 2,000 ms, or an occupancy map to determine a transformation between the current position and the local map, which may serve as a linear motion estimate. After mapping, localization may provide a position estimate that helps mitigate the error from slip. To allow for compensation of slip, the estimate of how much the robot is slipping is necessary to correct the motion estimate. Scan matching should work well independent of the surface or carpet type but requires suitable data to match against. This means that the method may not work when the robot is very close to walls or in wide open featureless spaces.

Special motions may also be used to measure the slip at 1206. Spinning the robot in place allows a differential measurement of the rate of turn from the IMU 108 and the rate of turn estimated by the wheels. Further, comparing the IMU 108 results with the wheel turn estimate yields both an estimate of slip as well as the directionality of the slip, by correlating the slip to heading. A rotational slip model with directionality may be transformed into a linear slip model with directionality. An advantage of this method of estimating slip is that it will work in almost any location relatively quickly. However, the method may not be wholly effective across various carpet types because some carpet types do not yield observable slip when turning. There may be significant potential variation translating rotational slip to linear slip.

Turning the robot in a figure-8 or turning on one wheel at various speeds is another special motion that may be used to measure slip. Spinning in a figure-8 or around one wheel may yield a more accurate estimate of the slip and directionality across carpet types, using the same principles as spinning in place. However, this method requires more space to operate and takes potentially more time. Aesthetically, the motion is also more noticeable by a human.

Because the robot builds a map of the environment, the robot can also build a map of the slip models using any of the previously mentioned approaches. The result is that, if the robot is in an area that already has a slip estimate, the robot does not need to perform any additional maneuvers or matching to account for slip. However, at some point the robot would still be required to estimate the slip and must localize the estimate of the slip.

A scaling factor may be applied to the wheel odometry values to correct for slip. The scaling factor can be estimated by one of the methods mentioned above. Alternatively, the scaling factor could be continuously estimated while driving on the surface using, for example, an EKF. A surface estimator sensor can be used to differentiate when the robot is on a new or different surface. As an example, measuring the current used by the brush to detect when the robot is on a different thickness of rug or on hardwood would be one method of determining when the robot transitions to a different surface. The method could also use visual or 3D sensors to make this determination. Surface types could be recorded on the map of the environment and the scaling factors for each surface could be tracked for different surfaces in different parts of the map. The vehicle may continuously reference updated scaling factors from the map.

Because the robot builds a map of the environment, the robot can also build a map of the slip models using any of the above approaches. The result is that if the disrobot is in an area that already has a slip estimate, the robot does not need to perform additional maneuvers or matching to account for slip. The map of slip models may be mapped to the local map 193, the regional map 194 or the global map 195 at 1212.

Figure 13:
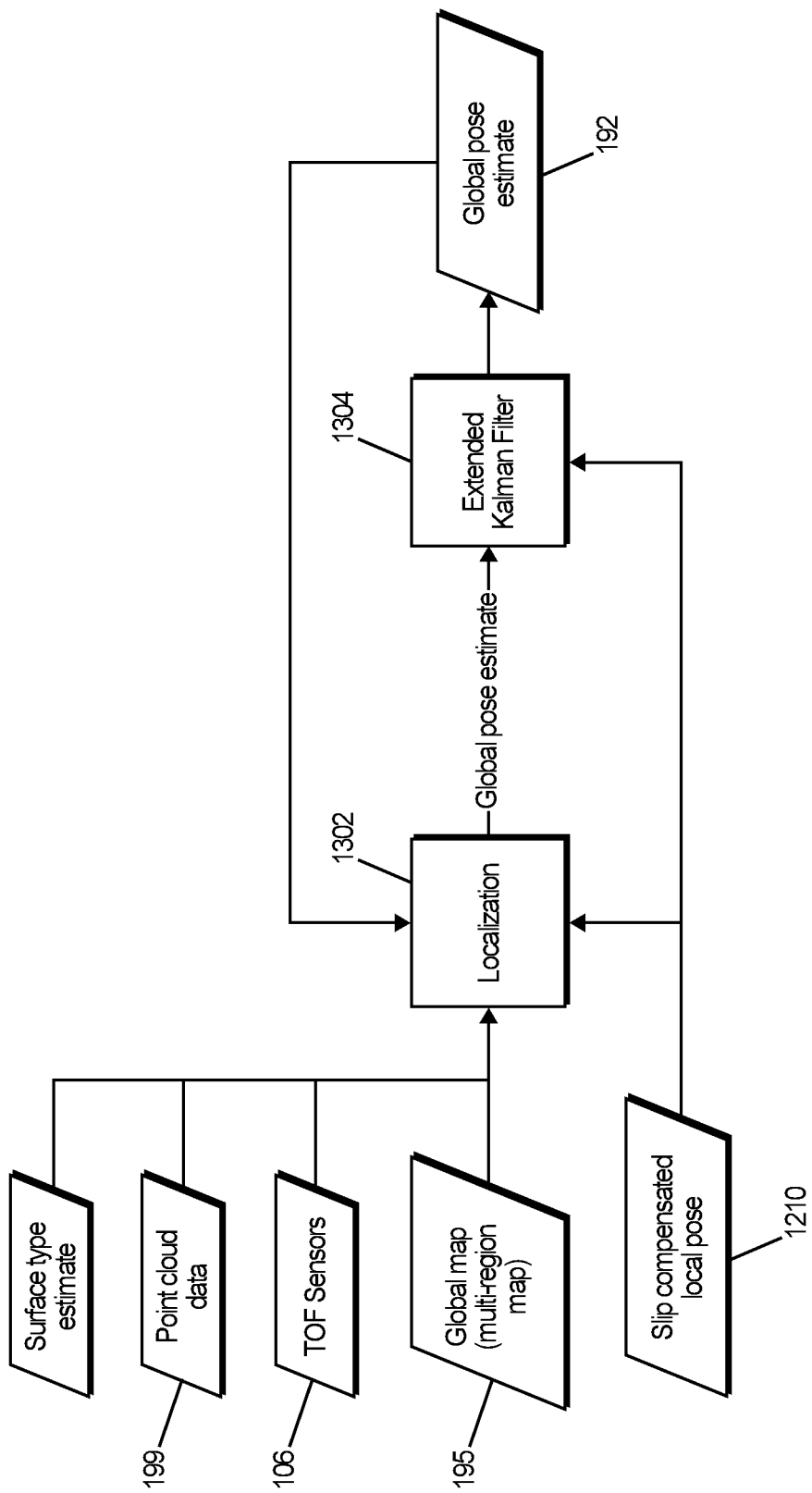
FIG. 13 is a dataflow diagram showing the production of a global pose estimate.

FIG. 13 shows the process whereby the navigation module calculates global pose. Localization uses point cloud data 199 and TOF data 106 in a Monte Carlo localization particle filter 1302 that uses the global map 195. Localization 1302 can operate in multiple maps simultaneously (typically multiple region maps) to have more consistent map data. Localization also can use the slip-compensated local pose 1210 to increase the aggressiveness of perturbations and solution search space when operating on surfaces that have more slip and variability. Additionally, localization 1302 can use and 3D stereo data from stereo cameras 104. Slip-compensated local pose estimate 1210, derived by the local pose estimator shown in FIG. 12, is used as an input to the EKF 1304. The results of the EKF 1304 are fed back into the localization process 1302 and also produces a global pose estimate 192.

In the case of using an MCL particle filter, the algorithm also has some features like outlier rejection, where, after localization/tracking is established, measurements that are more different than a set threshold are not used in the scoring process. Another feature for the MCL process is that when tracking is lost, the EKF location of the robot (driven completely by local pose once tracking in the MCL is lost) seeds the guess poses used by the particle filter to establish tracking and localization again. Tracking is determined as lost once the score from the best particle drops below a defined threshold. Tracking is determined as established once the iterations for initialization complete and the best score is above a defined threshold. Outlier rejection is typically not used during initialization.

Figure 14:
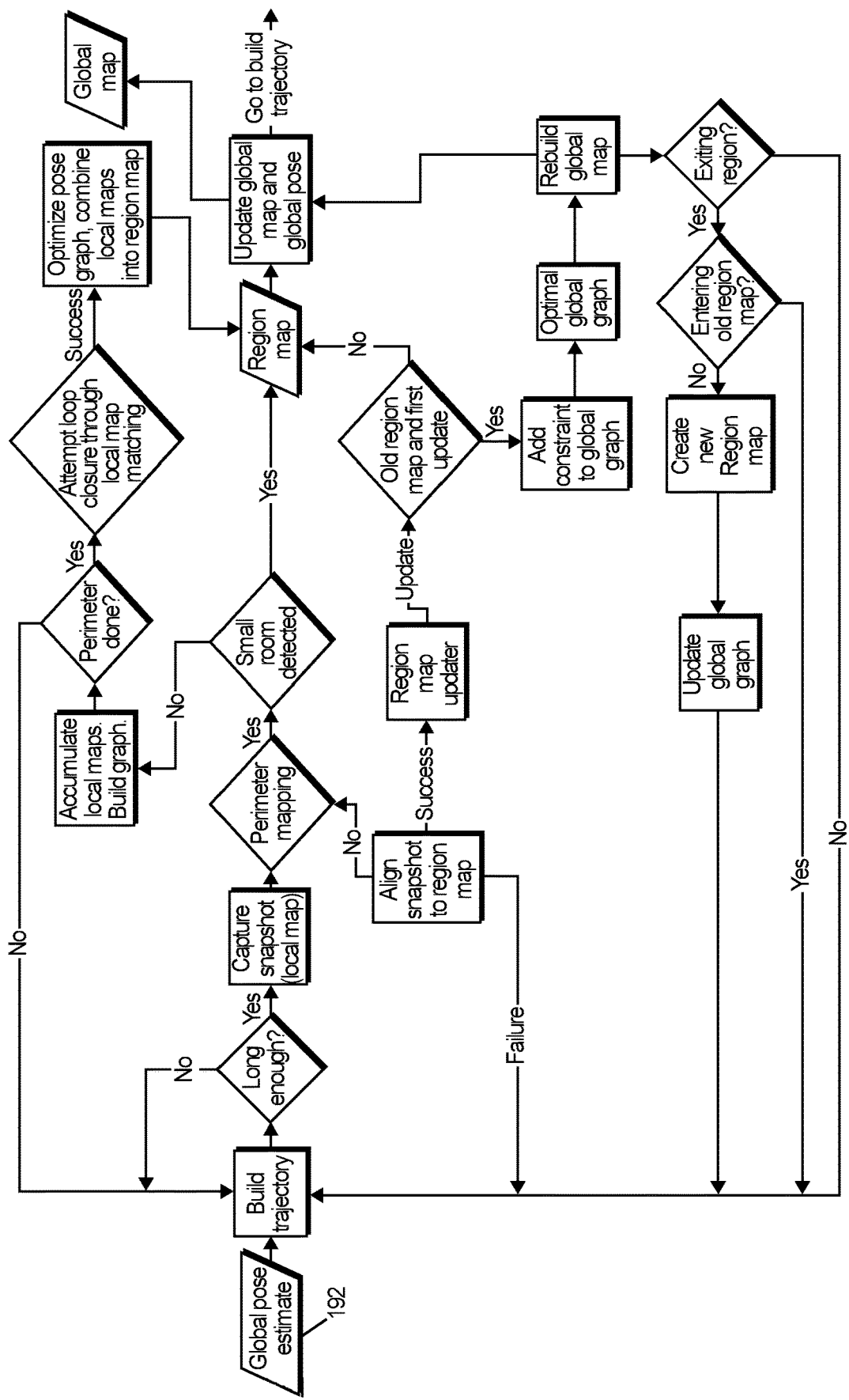
FIG. 14 is a flow diagram showing the global and regional mapping process.

FIG. 14 outlines the mapping flow for region and global mapping, both of which are aspects of SLAM. The module accumulates the global pose as a trajectory. When the trajectory length exceeds a threshold, the module takes a snapshot of the local map 190. If the robot is performing a perimeter of the area, the module first examines the local snap shot to determine if the room/area of operation is small (below a threshold for size/area). If the room/area is small, the snapshot of the local map is immediately converted to a region map using the global pose as a reference. If the area/room is not small, then the module accumulates the snapshots of the local maps creating a graph that represents the trajectory of the robot and the local map snapshots. If behavior indicates that the initial perimeter is complete, the module attempts to close the loop by performing scan matching between the snapshot and other local map snapshots accumulated. If successful, the graph is updated with the additional scan match constraint(s) and optimized. The resulting graph defines optimized locations of the local maps that balances the global pose trajectory information with the scan match constraints. The module uses optimized locations to combine the local maps into a single regional map 194. The regional map 194 is then added to the global map 195 and to the global graph, which represents regional maps, their positions, and constraints. The global map 195 is rebuilt by combining the regional maps 194 using the updated global graph information.

If the robot is not performing a perimeter map of the space, the module attempts to align the snapshot of the local map 193 to the current regional map 194. If alignment succeeds, then the module updates the current regional map 194. If the update is in a previously visited region and the robot has entered the region recently, the alignment is used to create an additional constraint to the global graph between the region just recently exited and the region the module successfully aligned and updated. The global graph is then updated and the global map 195 rebuilt by combining the regional maps 194 using the updated global graph information.

In some embodiments, the module can also match entire regions to prior regions to create constraints for the global graph.

In other embodiments, the module also calculates a limit for the size of area explored during the perimeter mapping phase. The limit is used by behaviors to ensure that the robot perimeter stays within a predetermined size.

In yet other embodiments, the module also calculates a combined limit for exploration combining size limits along with areas already cleaned so that behaviors explore a perimeter of an area while minimizing overlap with areas already cleaned.

Figure 15:
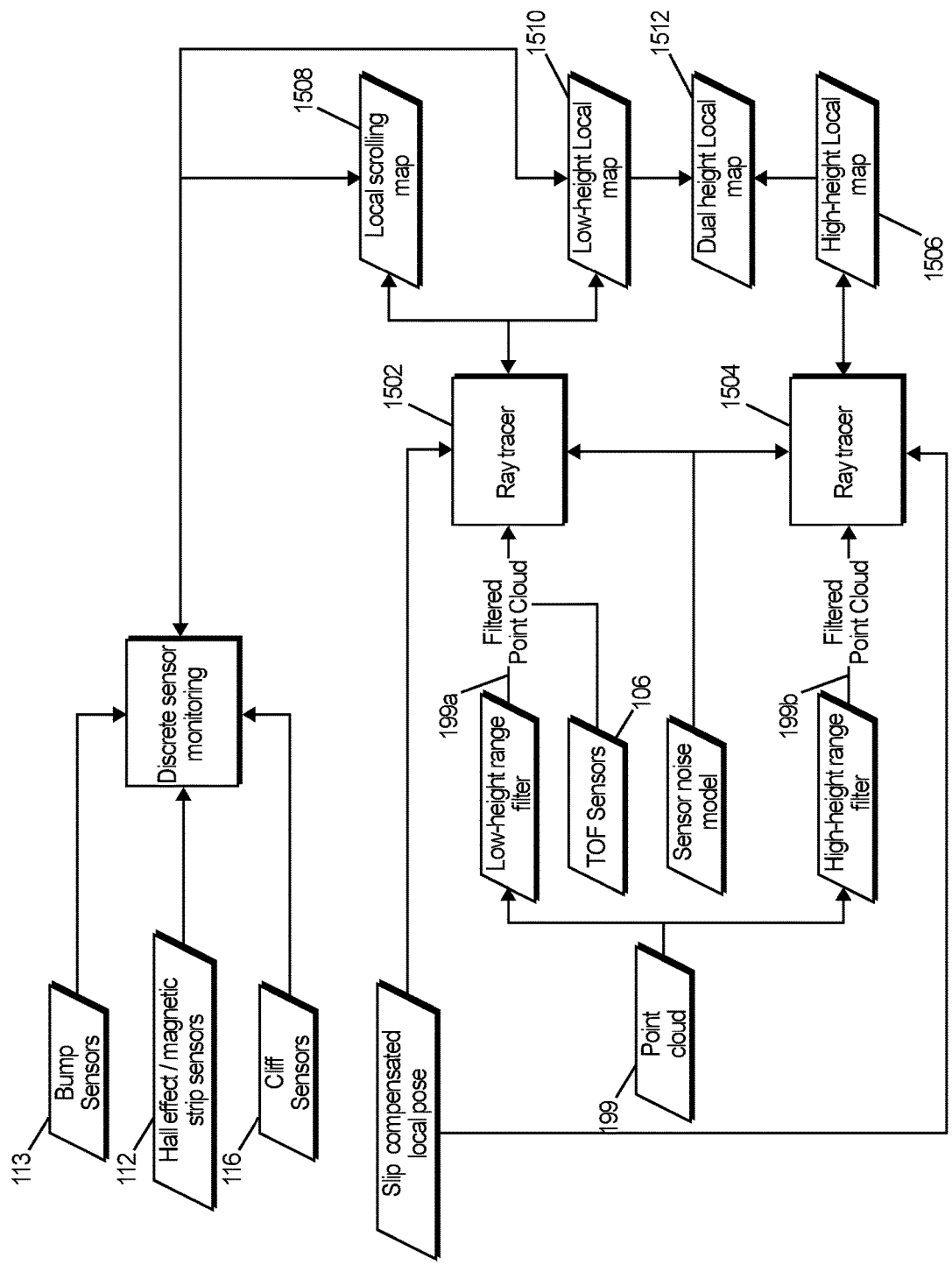
FIG. 15 is a block diagram showing the local mapping process.

FIG. 15 shows the mapping process. The pose is first estimated using wheel odometry, IMU data and visual odometry. A sequence of relative pose estimates (with some base pose) and associated weighting/confidence ratings, represents the initial pose graph. Loop closure, usually created through map matching, is a constraint to the pose graph. Constraints could also be, for example, landmark locations, unary constraints, calibration constraints, etc. An optimization process balances all the constraints on the pose graph. The 3D data associated with each pose overlays to a grid, quad-tree, octree or voxel grid. The cells of the grid could be confidence, binary occupancy, a probability function or representative point.

The point cloud 199 is segmented into points below 199*a* and above 199*b* a height threshold. The low-height point cloud 199*a* is used in conjunction with the TOF sensor data 106 in a ray tracer 1502 that updates both free and occupied cells in occupancy maps (at least one scrolling map and one local map). The high-height point cloud is used by a ray tracer 1504 to update an occupancy map used for a high-height local map 1506. Both ray trace modules model the noise for the sensors when updating the occupancy map to account for uncertainty from the different sensors. Bump sensors 113, cliff sensors 116, and Hall Effect sensors 116 (detect magnetic strip boundary) are also used to update the local scrolling map 1508 and low-height local map 1510 based on per sensor models that estimate uncertainty.

Both height maps can be combined to a single local map 1512 that represents both sets of information.

In a preferred embodiment, if the robot is trying to navigate to an area, but is unable reach the area, the area is marked as inaccessible in the robot maps, so the robot does not attempt to repeatedly try and clean the area it cannot get to.

Figure 16:
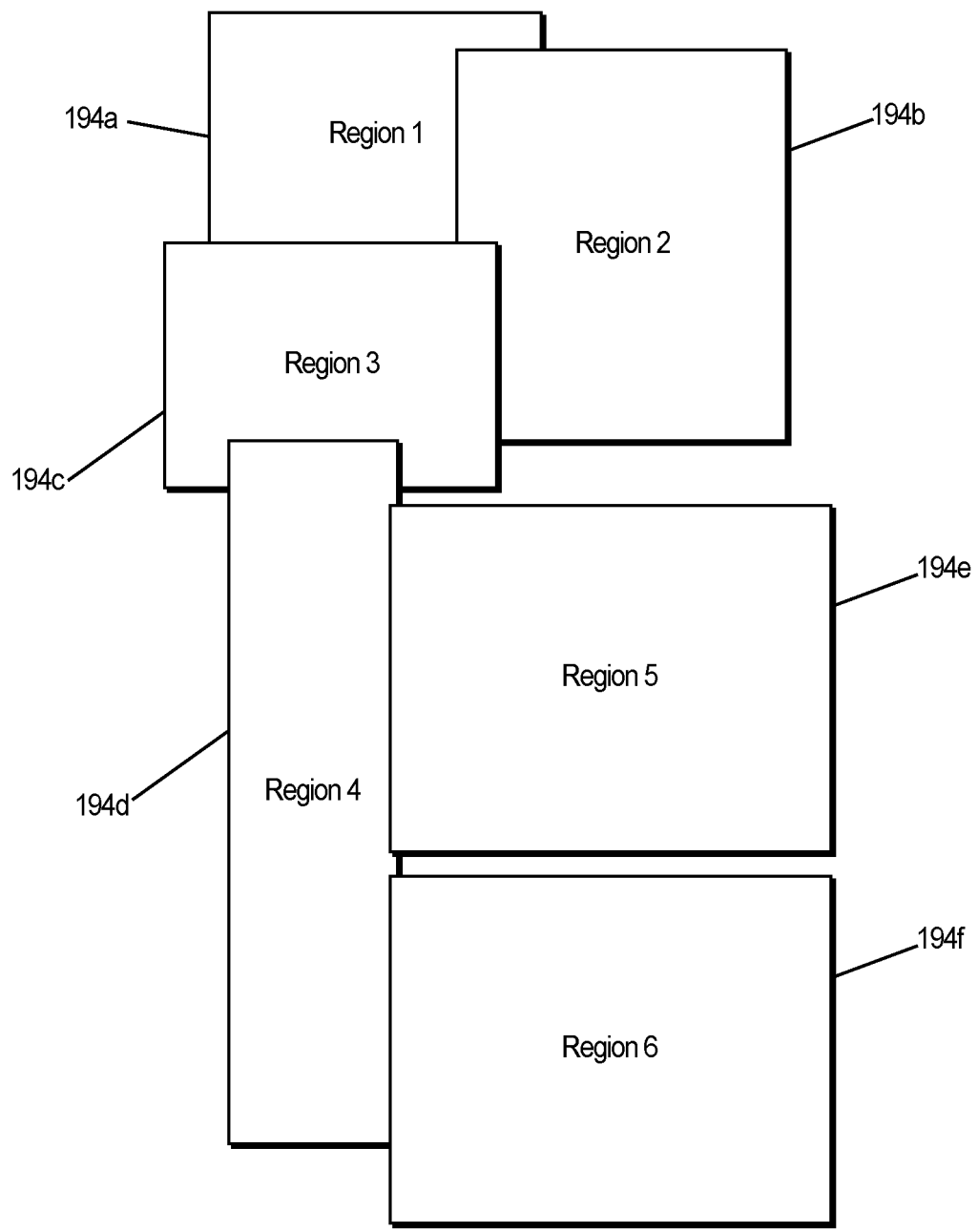
FIG. 16 shows a map composed of a plurality of sub maps or regions.

An example of a global map as shown in FIG. 16 and may be broken down into several regional maps 194*a* . . . 194*n*. Preferably, each regional map 194*a* . . . 194*n* is globally referenced to the same coordinate frame, so as to reference different region maps to each other. The global path planning plans the path of the robot between regions 194*a* . . . 194*n*, while the regional path planning plans the path of the robot within each regional map 194*a* . . . 194*n*. Local path planning plans the path of the robot within the vicinity of the robot within each region. Global planning can be accomplished by combining all of the region maps into a single global map 195.

In some embodiments, maps may include, at varying levels of resolution, additional information, for example, information regarding occupancy confidence, per sensor occupancy confidence, virtual walls, region designation, clean and/or covered status, dirt status, floor type, risk for getting stuck, and room labels. It should be realized that additional information could also be included within the map. In other embodiments, maps may also include a path defined as a sequence of locations and uncertainties between locations. This is different than a grid defining the robot path.

To those skilled in the art to which the invention relates, many modifications and adaptations of the invention will suggest themselves. Implementations provided herein, including implementations using various components or arrangements of components should be considered exemplary only and are not meant to limit the invention in any way. As one of skill in the art would realize, many variations on implementations discussed herein which fall within the scope of the invention are possible. Accordingly, the exemplary methods and apparatuses disclosed herein are not to be taken as limitations on the invention, but as an illustration thereof.

We claim:

1. A robot comprising:
a chassis defining a longitudinal axis extending from a fore side to an aft side of the robot and a transverse axis perpendicular to the longitudinal axis extending from a left side to a right side of the robot;
a motive system for moving the robot across a surface generally along the longitudinal axis;
left and right stereo cameras mounted on the fore side of the chassis;
a source of illumination mounted on the fore side of the chassis;
a microcontroller and memory mounted in the chassis;
local, regional and global maps stored in the memory; and
software, stored in the memory and executed by the microcontroller, for controlling the robot;
wherein the software includes a navigation module creating point cloud to aid in localization of the robot, the creation of the point cloud comprising:
collecting images from the left and right cameras;
calculating disparity data representing a stereo disparity between the left and right images;
extracting features from one of the left or right images using a feature detector;
calculating the point cloud from the extracted features and the disparity date; and
adjusting the point cloud using an attitude extracted from a local pose of the robot.

2. The robot of claim 1 wherein the stereo cameras are capable of detecting both visual light and infrared light and further wherein the source of illumination comprises one or more of a source of visual illumination and a source of infrared illumination.

3. The robot of claim 2 wherein the source of infrared illumination projects a pattern for introducing texture on surfaces and wherein detection of the pattern by the stereo cameras is used for mapping and disparity calculation.

4. The robot of claim 2 wherein the detection of illumination is used to generate visual odometry.

5. The robot of claim 2 wherein the detection of illumination is used for place recognition.

6. The robot of claim 1 wherein the one or more stereo cameras have a field of view, further comprising a plurality of time-of-flight rangefinders mounted on the chassis wherein one or more of the rangefinders has a field of view outside of the field of view of the one or more stereo cameras.

7. The robot of claim 6 wherein the plurality of rangefinders includes a rear-facing pair of rangefinders, one rangefinder of the pair mounted on the left side of the chassis and the other of the pair mounted on the right side of the chassis, the pair of rangefinders mounted fore of the transverse axis and facing in a generally aft direction.

8. The robot of claim 6 wherein the plurality of rangefinders includes a front-facing pair of rangefinders mounted on the chassis such as to be facing in a fore, off-centered direction.

9. The robot of claim 6 wherein the plurality of rangefinders includes a pair side facing rangefinders mounted on the chassis facing generally parallel to the transverse axis, facing in left and right directions.

10. The robot of claim 1 further comprising:
an inertial measuring unit; and
encoders for providing odometry from the motive system.

11. The robot of claim 1 further comprising;
a downward facing camera mounted on the chassis;
wherein the software calculates speed and direction of the robot with respect to the ground surface using data provided by the downward facing camera.

12. The robot of claim 1 further comprising a battery voltage or charge sensor, wherein the software performs the functions of:
estimating the charge needed to execute the return-to-dock behavior;
determining that battery voltage or charge has fallen below a threshold to safely be able to return-to-dock; and
triggering a return-to-dock behavior.

13. The robot of claim 1 further comprising:
one or more rotating brushed driven by one or more motors;
one or more brush current sensors to sense current consumed by the one or more motors; and
one or more wheel current sensors;
wherein data from the one or more brush current sensors is used to estimate a floor type;
wherein the sensed wheel current may be correlated with the floor type and one or more slip models, stored in the memory, to estimate wheel slip.

14. The robot of claim 1 wherein the software performs the functions of:
detecting when a lens cover covering the stereo cameras requires cleaning; and
alerting a user to clean the lens cover.

15. The robot of claim 14 wherein the software performs the functions of:
comparing images and disparity data when docking with expected images and disparity data to determine that the lens cover is dirty; and
alerting a user to clean the lens cover.

16. The robot of claim 1 further comprising one or more wheel drop sensors associated with the motive system, wherein the software performs the function of determining when the robot is in a beached condition based on data from the one or more wheel drop sensors.

17. The robot of claim 16 wherein the software performs the function of executing an escape motion to correct the beached condition.

18. The robot of claim 1 further comprising one or more bump sensors, wherein the software performs the function of determining when the robot is in a tight space and escaping the tight space using data from the one or more bump sensors.

19. The robot of claim 1 wherein the software only maps regions that have not been previously cleaned.

20. The robot of claim 1 wherein the software performs the function of taking a snapshot of an area to determine if the size of the area is below a threshold and converting a local map of the area to a regional map.

21. The robot of claim 1 wherein the software determines that an area is inaccessible and marking the area as inaccessible in the local, regional or global maps.

22. The robot of claim 1 wherein the software performs a perimeter behavior function to map a region by completing a loop of the region, using natural barriers, obstacles or walls to define a perimeter of the loop.

* * * * *